(12) United States Patent
Imamura et al.

(10) Patent No.: US 7,927,250 B2
(45) Date of Patent: Apr. 19, 2011

(54) CONTROL APPARATUS FOR VEHICULAR POWER TRANSMITTING SYSTEM

(75) Inventors: Tatsuya Imamura, Okazaki (JP); Yuji Iwase, Mishima (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 414 days.

(21) Appl. No.: 12/285,827

(22) Filed: Oct. 15, 2008

(65) Prior Publication Data

US 2009/0114464 A1 May 7, 2009

(30) Foreign Application Priority Data

Nov. 1, 2007 (JP) ................................ 2007-285103

(51) Int. Cl.
*B60K 1/02* (2006.01)
(52) U.S. Cl. .......................................................... 477/3
(58) Field of Classification Search ........................ 477/3
See application file for complete search history.

(56) References Cited

U.S. PATENT DOCUMENTS

| 7,555,374 B2 * | 6/2009 | Wu et al. ......................... 701/29 |
| 7,568,994 B2 * | 8/2009 | Heap ............................... 477/3 |
| 7,854,680 B2 * | 12/2010 | Sugai et al. ..................... 477/15 |

FOREIGN PATENT DOCUMENTS

JP A-2005-331063 12/2005

* cited by examiner

*Primary Examiner* — Dirk Wright
(74) *Attorney, Agent, or Firm* — Oliff & Berridge, PLC

(57) ABSTRACT

A control apparatus for a vehicular power transmitting system including (a) an electrically controlled differential portion operable to distribute an output of a drive power source of a vehicle to a first electric motor and a power transmitting member, (b) a second electric motor connected to a power transmitting path between an output shaft of the drive power source and a drive wheel of the vehicle, (c) a coupling device provided in the electrically controlled differential portion and operable to selectively switch the differential portion between a differential state and a non-differential state, and (d) an electric-energy storage device operable to store and discharge an electric energy supplied from the first or second electric motor, the control apparatus including a torque-receiving-proportion control portion configured to control a proportion of torque values of a reaction torque corresponding to a torque acting on a predetermined member of the electrically controlled differential portion, which torque values are respectively received by the first electric motor and the coupling device, such that a ratio of the torque value received by the coupling device, with respect to the reaction torque, increases with an increase of a difference of an electric energy amount consumed by the second electric motor from an electric energy amount generated by the first electric motor.

11 Claims, 7 Drawing Sheets

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | SPREAD 4.76 |
| R | | | ○ | | | ○ | | 3.209 | |
| N | | | | | | | | | |

○ ENGAGED
◎ ENGAGED FOR STEP-VARIABLE SHIFTING, AND RELEASED FOR CONTINUOUSLY-VARIABLE SHIFTING

CONTROL APPARATUS FOR VEHICULAR POWER TRANSMITTING SYSTEM

The present application claims priority from Japanese Patent Application No. 2007-285103 filed on Nov. 1, 2007, the disclosure of which is herein incorporated by reference in its entirety.

BACKGROUND OF THE INVENTION

1. Field of the Invention

The present invention relates in general to a control apparatus for a vehicular power transmitting system including an electrically controlled differential portion operable to distribute an output of a drive power source to a first electric motor and a power transmitting member, and a second electric motor connected to a power transmitting path between an output shaft of the drive power source and a drive wheel of a vehicle, and more particularly to techniques for optimizing a balance between an amount of charging of an electric-energy storage device with an electric energy generated by the first electric motor and an amount of electric energy of the electric-energy storage device consumed by the second electric motor.

2. Discussion of Prior Art

There is known a vehicular power transmitting system including (a) an electrically controlled differential portion operable to distribute an output of a drive power source of a vehicle to a first electric motor and a power transmitting member, (b) a second electric motor connected to a power transmitting path between an output shaft of the drive power source and drive wheels of the vehicle, (c) a coupling device provided in the electrically controlled differential portion and operable to selectively switch the differential portion between a differential state and a non-differential state, and (d) an electric-energy storage device operable to store and discharge an electric energy supplied from the first or second electric motor. JP-2005-331063A discloses an example of such a vehicular power transmitting system in the form of a hybrid vehicle power transmitting system. In the hybrid vehicle power transmitting system disclosed in this publication, the electrically controlled differential portion is constituted by a planetary gear set, for example, and this differential portion performs a differential function so that a major part of a drive force generated by the drive power source is mechanically transmitted to the vehicle drive wheels, while a remaining part of the drive force is converted by the first electric motor into an electric energy, which is stored in the electric-energy storage device or supplied to the second electric motor, through an inverter. The vehicular power transmitting system of the publication is further configured to permit starting of the vehicle with the drive power source by placing the coupling device in a slipping state (partially engaged state), even where the first electric motor is not able to generate a sufficient reaction torque during the vehicle starting with the drive power source.

In the power transmitting system for a hybrid vehicle as disclosed in the above-identified publication, the electric-energy storage device which is charged and discharged by the first and second electric motors can be charged with an electric energy generated by the first electric motor when the amount of electric energy stored in the electric-energy storage device is relatively small, but may be excessively charged if the electric energy generated by the first electric motor is supplied to the electric-energy storage device when the amount of electric energy stored in the electric-energy storage device is relatively large. It is possible to prevent overcharging of the electric-energy storage device by limiting the amount of electric energy generated by the first electric motor. However, the limitation of the electric energy generated by the first electric motor results in a failure of the first electric motor to generate a sufficient reaction torque, and consequent limitation of an output torque to be transmitted to the drive wheels. The above-identified publication proposes to place the coupling device in the slipping state for permitting mechanical generation of a reaction torque. However, the amount of slipping of the coupling device should be rapidly increased if the slipping control of the coupling device is implemented immediately before the electric-energy storage device is excessively charged. The rapid increase of the slipping amount may cause an overloading of the coupling device.

SUMMARY OF THE INVENTION

The present invention was made in view of the background art described above. It is therefore an object of this invention to provide a control apparatus for a vehicular power transmitting system including an electrically controlled differential mechanism operable to distribute an output of a drive power source to a first electric motor and a power transmitting member, and a second electric motor connected to a power transmitting path between an output shaft of the drive power source and a drive wheel of a vehicle, which control apparatus permits an adequate control of an energy storage capacity of an electric-energy storage device which is charged and discharged by the first and second electric motors.

The object indicated above can be achieved according to any one of the following modes of this invention, each of which is numbered like appended claims and depends from the other mode or modes, where appropriate, for easier understanding of technical features disclosed in the present application, and possible combinations of those technical features.

(1) A control apparatus for a vehicular power transmitting system including (a) an electrically controlled differential portion operable to distribute an output of a drive power source of a vehicle to a first electric motor and a power transmitting member, (b) a second electric motor connected to a power transmitting path between an output shaft of the drive power source and a drive wheel of the vehicle, (c) a coupling device provided in the electrically controlled differential portion and operable to selectively switch the electrically controlled differential portion between a differential state and a non-differential state, and (d) an electric-energy storage device operable to store and discharge an electric energy supplied from the first or second electric motor, the control apparatus comprising a torque-receiving-proportion control portion configured to control a proportion of torque values of a reaction torque corresponding to a torque acting on a predetermined member of the electrically controlled differential portion, which torque values are respectively received by the first electric motor and the coupling device, such that a ratio of the torque value received by the coupling device, with respect to the reaction torque, increases with an increase of a difference of an electric energy amount consumed by the second electric motor from an electric energy amount generated by the first electric motor.

The control apparatus constructed according to the above-described mode (1) of the present invention comprises the torque-receiving-proportion control portion configured to control that the proportion of the torque values of the reaction torque corresponding to the torque acting on the predetermined member of the electrically controlled differential portion, which torque values are respectively received by the first electric motor and the coupling device, such that the ratio of the torque value received by the coupling device, with respect to the reaction torque, increases with an increase of the difference of the electric energy amount consumed by the second electric motor from the electric energy amount generated by the first electric motor. Accordingly, the ratio of the torque value received by the coupling device is increased as the above-indicated difference increases, that is, as the electric energy amount stored in the electric-energy storage device increases, so that the reaction torque received by the first electric motor is reduced, and the electric energy amount generated by the first electric motor is accordingly reduced, whereby the electric energy amount supplied to the electric-energy storage device is accordingly reduced. Thus, the balance between the charging and discharging amounts of the electric-energy storage device is suitably optimized so as to prevent overcharging of the electric energy-storage device, making it possible to prolong the expected service life of the electric-energy storage device.

(2) The control apparatus according to the above-described mode (1), wherein the coupling device is operable to limit a rotary motion of a rotary element of the electrically controlled differential portion, which rotary element is connected to the first electric motor.

In the above-described mode (2) of the invention, the coupling device is a device operable to limit the rotary motion of the rotary element of the electrically controlled differential portion, which rotary element is connected to the first electric motor. In this mode, therefore, the proportion of the reaction torque values received by the first electric motor and the coupling device can be changed to control the electric energy amount generated by the first electric motor, by controlling the slipping amount of the coupling device. In addition, the coupling device provided to selectively switch the electrically controlled differential portion between the differential and non-differential states is utilized to control the electric energy amount generated by the first electric motor, so that the electric energy amount generated by the first electric motor can be controlled without an increase of the number of the required components of the power transmitting system.

(3) The control apparatus according to the above-described mode (1), wherein the coupling device is operable to connect at least two coupling elements of a plurality of rotary elements of the electrically controlled differential portion.

In the above-described mode (3) of the invention, the coupling device is a device operable to connect at least two of the plurality of the electrically controlled differential portion. In this mode, therefore, the proportion of the reaction torque values received by the first electric motor and the coupling device can be changed to control the electric energy amount generated by the first electric motor, by controlling the slipping amount of the coupling device. In addition, the coupling device provided to selectively switch the electrically controlled differential portion between the differential and non-differential states is utilized to control the electric energy amount generated by the first electric motor, so that the electric energy amount generated by the first electric motor can be controlled without an increase of the number of the required components of the power transmitting system.

(4) The control apparatus according to the above-described mode (2) or (3), further comprising a slipping-start control portion configured to place the coupling device in a slipping state upon starting of the vehicle by the drive power source, and wherein the torque-receiving-proportion control portion is operated during the starting of the vehicle with the coupling device placed in the slipping state under the control of the slipping-start control portion, to increase the ratio of the torque value received by the coupling device, with the increase of the difference of the electric energy amount consumed by the second electric motor from the electric energy amount generated by the first electric motor In the above-described mode (4) of this invention, the torque-receiving-proportion control portion is operated during the starting of the vehicle with the coupling device placed in the slipping state under the control of the slipping-start control portion, to increase the ratio of the torque value received by the coupling device, with the increase of the difference of the electric energy amount consumed by the second electric motor from the electric energy amount generated by the first electric motor. Accordingly, the balance between the charging and discharging amounts of the electric-energy storage device is suitably optimized so as to prevent overcharging of the electric energy-storage device.

(5) The control apparatus according to the above-described mode (3), further comprising a torque circulation control portion configured to place the coupling device in a slipping state, for controlling a state of circulation of the torque among the drive power source, the first and second electric motors and the electric-energy storage device, and wherein the torque-receiving-proportion control portion is operated while the state of circulation of the torque is controlled with the coupling device placed in the slipping state under the control of the torque circulation control portion, to increase the ratio of the torque value received by the coupling device, with the increase of the difference of the electric energy amount consumed by the second electric motor from the electric energy amount generated by the first electric motor.

In the above-described mode (5) of the invention, the torque-receiving-proportion control portion is operated while the state of circulation of the torque is controlled with the coupling device placed in the slipping state under the control of the torque circulation control portion, to increase the ratio of the torque value received by the coupling device, with the increase of the difference of the electric energy amount consumed by the second electric motor from the electric energy amount generated by the first electric motor. Accordingly, the balance between the charging and discharging amounts of the electric-energy storage device is suitably optimized so as to prevent overcharging of the electric energy-storage device.

(6) The control apparatus according to the above-described mode (1), wherein the torque-receiving-proportion control portion increases the ratio of the torque value received by the coupling device, with a decrease of a residual energy-storage capacity of the electric-energy storage device.

In the above-described mode (6) of the present invention, the torque-receiving-proportion control portion increases the ratio of the torque value received by the coupling device, with a decrease of the residual energy-storage capacity of the electric-energy storage device, that is, with a decrease of an electric energy amount that can be further stored in the electric-energy storage device. In this mode, the electric energy amount generated by the first electric motor and supplied to the electric-energy storage device is reduced when the residual energy-storage capacity of the electric-energy storage device is relatively small. Accordingly, overcharging of the electric-energy storage device is prevented. When the residual energy-storage capacity of the electric-energy storage device is relatively large, on the other hand, the ratio of the torque value received by the coupling device is reduced to permit an increase of the electric energy amount regenerated by the first electric motor operated as an electric generator, whereby the fuel economy of the vehicle can be improved.

(7) The control apparatus according to the above-described mode (1), wherein the torque-receiving-proportion control portion changes the proportion of the torque values which torque values are respectively received by the first electric motor and the coupling device, when a changing amount or a discharging amount of the electric-energy storage device per unit time exceeds a predetermined upper limit.

In the above-described mode (7) of this invention, the ratio of the torque value received by the coupling device is increased when the charging amount of the electric-energy storage device per unit time exceeds the upper limit, for example. Accordingly, overcharging of the electric-energy storage device is prevented. When the discharging amount of the electric-energy storage device per unit time exceeds the upper limit, on the other hand, the ratio of the torque value received by the first electric motor is increased. Accordingly, overdischarging of the electric-energy storage device is prevented.

(8) The control apparatus according to the above-described mode (1), further comprising a hybrid control portion configured to limit an output torque of the drive power source when a torque capacity of the coupling device is limited.

In the above-described mode (8) of this invention, the torque of the drive power source is reduced to a value below which the first electric motor or the coupling device can receive the reaction torque corresponding to the output torque of the drive power source, even while the torque capacity of the coupling device is limited.

(9) The control apparatus according to the above-described mode (1), further comprising a hybrid control portion configured to calculate an output torque of the electrically controlled differential portion on the basis of an operating amount of an accelerator pedal of the vehicle.

In the above-described mode (9) of the invention, the reaction torque can be controlled on the basis of the output torque of the drive power source and the output torque of the electrically controlled differential portion.

(10) The control apparatus according to the above-described mode (1), wherein the electrically controlled differential portion functions as an electrically controlled continuously-variable transmission portion.

In the above-described mode (10) of the invention, the speed ratio of the electrically controlled differential portion can be continuously changed by controlling the first electric motor or the second electric motor, so that the vehicle drive force can be changed over a wide range of the speed ratio.

BRIEF DESCRIPTION OF THE DRAWINGS

The above and other objects, features, advantages and technical and industrial significance of this invention will be better understood by reading the following detailed description of a preferred embodiment of the invention, when considered in connection with the following drawings, in which.

DETAILED DESCRIPTION OF PREFERRED EMBODIMENT

Figures 1, 2:
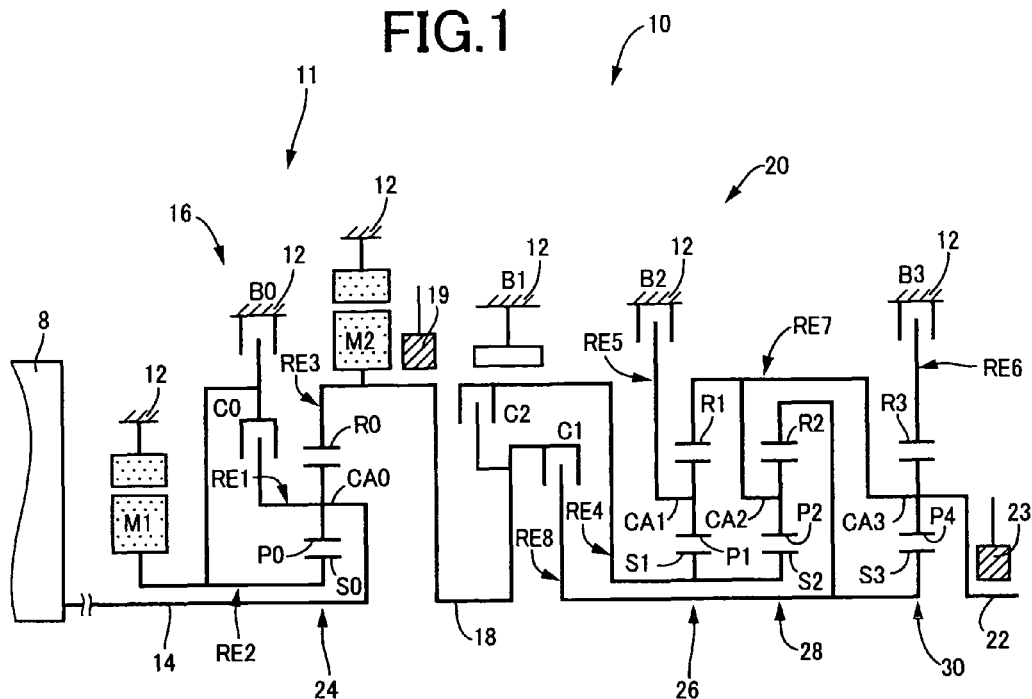
FIG. 1 is a schematic view showing an arrangement of a power transmitting system of a hybrid vehicle to which the present invention is applicable.
FIG. 2 is a table indicating shifting actions of the hybrid vehicle power transmitting system of FIG. 1, which is operable in a selected one of a continuously-variable shifting state and a step-variable shifting state, in relation to different combinations of operating states of hydraulically operated frictional coupling devices to effect the respective shifting actions.
Figure 5:
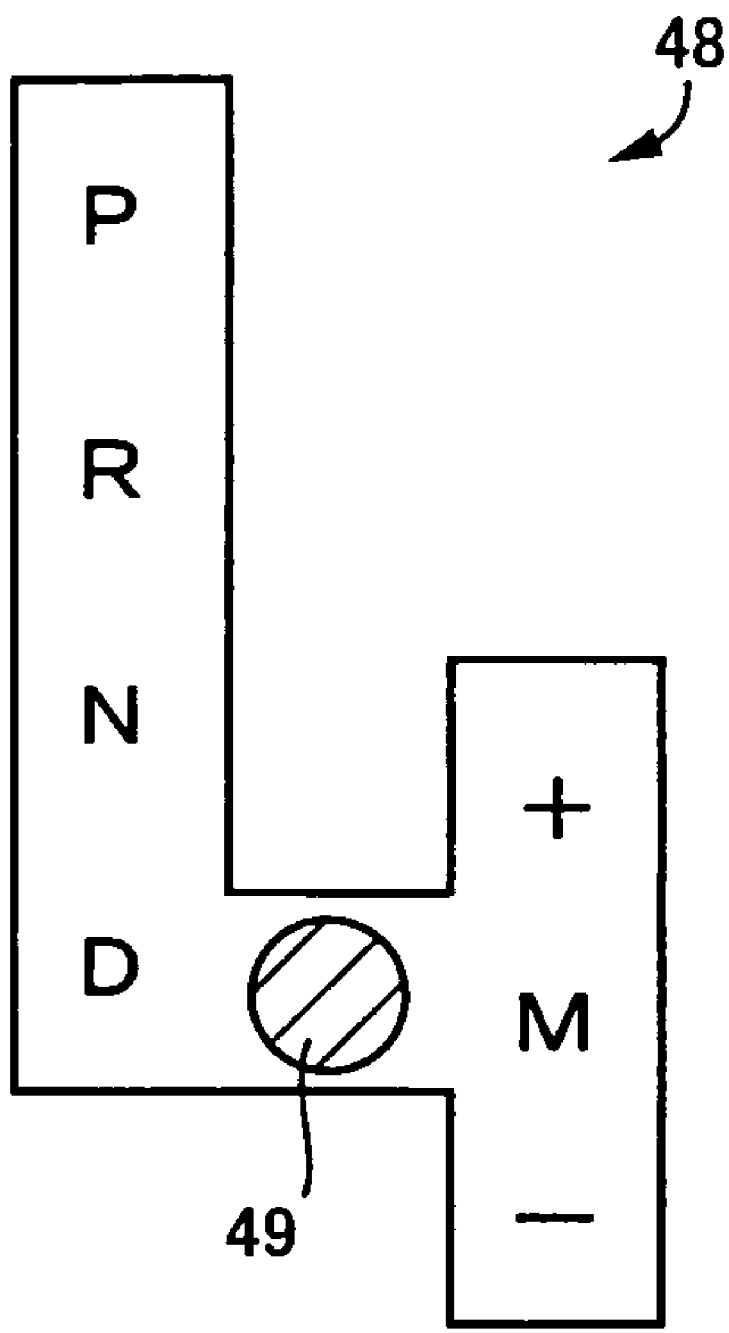
FIG. 5 is a manually operable shifting device including a shift lever having a plurality of shift positions.

Referring to the schematic view of FIG. 1, there is shown a transmission mechanism 10 constituting a part of a power transmitting system for a hybrid vehicle, which power transmitting system is controlled by a control apparatus according to one embodiment of this invention. In FIG. 1, the transmission mechanism 10 includes: an input rotary member in the form of an input shaft 14; a differential portion 11 connected to the input shaft 14 either directly, or indirectly via a pulsation absorbing damper (vibration damping device) not shown; a step-variable or multiple-step transmission portion in the form of an automatic transmission portion 20 disposed between the differential portion 11 and drive wheels 38 (shown in FIG. 6) of the vehicle, and connected in series via a power transmitting member 18 (power transmitting shaft) to the differential portion 11 and the drive wheels 38; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper. The differential gear device 36 constitutes a part of a power transmitting path. It will be understood that the differential portion 11 functions as an electrically controlled differential portion of the transmission mechanism 10, which constitutes a part of the power transmitting system controlled by the control apparatus of the present invention, and that the power transmitting member 18 which connects an output shaft of the differential portion 11 and an input shaft of the automatic transmission portion 20 also functions as the output shaft of the differential portion 11 and the input shaft of the automatic transmission portion 20.

In the present transmission mechanism 10, the engine 8 and the differential portion 11 are connected directly to each other. This direct connection means that the engine 8 and the differential portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 is operable as the electrically controlled differential portion the differential state of which is controlled by controlling the operating state of the first electric motor M1. This differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16, which is a differential mechanism, includes as major components a planetary gear set 24 of a single pinion type having a gear ratio ρ0 of about 0.418, for example, a switching clutch C0 and a switching brake B1. The planetary gear set 24 of the power distributing mechanism 16 has rotary elements consisting of: a sun gear S0, a planetary gear P0; a carrier CA0 supporting the planetary gear P0 such that the planetary gear P0 is rotatable about its axis and about the axis of the sun gear S0; and a ring gear R0 meshing with the sun gear S0 through the planetary gear P0. Where the numbers of teeth of the sun gear S0 and the ring gear R0 are represented by ZS0 and ZR0, respectively, the above-indicated gear ratio ρ0 is represented by ZS0/ZR0.

In the power distributing mechanism 16, the carrier CA0 is connected to the input shaft 14, that is, to the engine 8, and the sun gear S0 is connected to the first electric motor M1, while the ring gear R0 is connected to the power transmitting member 18. The switching brake B0 is disposed between the sun gear S0 and the casing 12, and the switching clutch C0 is disposed between the sun gear S0 and the carrier CA0. When the switching clutch C0 and brake B0 are both released, the power distributing mechanism 16 is placed in a differential state in which three elements of the first planetary gear set 24 consisting of the sun gear S0, carrier CA0 and ring gear R0 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the differential portion 11 (power distributing mechanism 16) is placed in the continuously-variable shifting state (electrically established CVT state), in which the rotating speed of the power transmitting member 18 is continuously variable, irrespective of the rotating speed of the engine 8, namely, placed in the differential state in which the differential state between the rotating speed of the input shaft 14 connected to the engine 8 and the rotating speed of the power transmitting member 18 functioning as the output shaft is controlled by controlling the operating states of the first and second electric motors M1, M2 operatively connected to the power distributing mechanism 16. The rotating speed $N_{18}$ of the power transmitting member 18 is detected by a resolver disposed near the second electric motor M2 and operable to detect the direction of rotation as well as the speed.

When the switching clutch C0 or brake B0 is engaged while the power distributing mechanism 16 is placed in the continuously-variable shifting state, the power distributing mechanism 16 is brought into a non-differential state in which the differential function is not available. Described in detail, when the switching clutch C0 is engaged, the sun gear S0 and the carrier CA0 are connected together, so that the power distributing mechanism 16 is placed in a locked state in which the three rotary elements of the planetary gear set 24 consisting of the sun gear S0, carrier CA0 and ring gear R0 are rotatable as a unit, namely, placed in a first non-differential state in which the differential function is not available, so that the differential portion 11 is also placed in a non-differential state. In this first non-differential state, the rotating speed of the engine 8 and the rotating speed of the power transmitting member 18 are made equal to each other, so that the differential portion 11 (power distributing mechanism 16) is placed in a fixed-speed-ratio shifting state or step-variable shifting state in which the mechanism 16 functions as a transmission having a fixed speed ratio γ0 equal to 1. When the switching brake B0 is engaged in place of the switching clutch C0, the sun gear S0 is fixed to the casing 12, so that the power distributing mechanism 16 is placed in the locked state in which the sun gear S0 is not rotatable, namely, placed in a second non-differential state in which the differential function is not available, so that the differential portion 11 is also placed in the non-differential state. Since the rotating speed of the ring gear R0 is made higher than that of the carrier CA0, the differential portion 11 is placed in the fixed-speed-ratio shifting state or step-variable shifting state in which differential portion 11 (the power distributing mechanism 16) functions as a speed-increasing transmission having a fixed speed ratio γ0 smaller than 1, for example, about 0.7.

Thus, the frictional coupling devices in the form of the switching clutch C0 and brake B0 function as a differential-state switching device operable to selectively switch the differential portion 11 (power distributing mechanism 16) between the differential state (namely, non-locked state) and the non-differential state (namely, locked state), that is, between the continuously-variable shifting state in which the differential portion 11 (the power distributing mechanism 16)

is operable as an electrically controlled continuously variable transmission the speed ratio of which is continuously variable, and the locked state in which the differential portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the differential portion 11 is operable as a transmission having a single gear position with one speed ratio or a plurality of gear positions with respective speed ratios, namely, the fixed-speed-ratio shifting state in which the differential portion 11 is operated as a transmission having a single gear position with one speed ratio or a plurality of gear positions with respective speed ratios.

The automatic transmission portion 20, which constitutes a part of the power transmitting path of the transmission mechanism 10, includes a single-pinion type first planetary gear set 26, a single-pinion type second planetary gear set 28 and a single-pinion type third planetary gear set 30. The second planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a gear ratio $\rho 1$ of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio $\rho 2$ of about 0.425. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a gear ratio $\rho 3$ of about 0.421. Where the numbers of teeth of the first sun gear S1, first ring gear R1, second sun gear S2, second ring gear R2, third sun gear S3 and third ring gear R3 are represented by ZS1, ZR1, ZS1, ZR2, ZS3 and ZR3, respectively, the above-indicated gear ratios $\rho 1$, $\rho 2$ and $\rho 3$ are represented by ZS1/ZR1, ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a second clutch C2, and selectively fixed to the casing 12 through a first brake B1. The first carrier CA1 is selectively fixed to the casing 12 through a second brake B2, and the third ring gear R3 is selectively fixed to the casing 12 through a third brake B3. The first ring gear R1, second carrier CA2 and third carrier CA3 are integrally fixed to each other and fixed to the output shaft 22. The second ring gear R2 and the third sun gear S3 are integrally fixed to each other and selectively connected to the power transmitting member 18 through a first clutch C1.

Thus, the automatic transmission portion 20 and the power transmitting member 18 are selectively connected to each other through the first clutch C1 or the second clutch C2, which is provided to shift the automatic transmission portion 20. In other words, the first clutch C1 and the second clutch C2 function as a coupling device operable to place a power transmitting path between the power transmitting member 18 and the automatic transmission portion 20, that is, between the differential portion 11 (power transmitting member 18) and the drive wheels 38, selectively in one of a power transmitting state in which a vehicle drive force can be transmitted through the power transmitting path, and a power cut-off state in which the vehicle drive force cannot be transmitted through the power transmitting path. Described more specifically, the above-indicated power transmitting path is placed in the power transmitting state when at least one of the first clutch C1 and the second clutch C2 is placed in the engaged state, and is placed in the power cut-off state when the first clutch C1 and the second clutch C2 are placed in the released state.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

The transmission mechanism 10 constructed as described above is placed in a selected one of a first gear position (first speed position) through a fifth gear position (fifth speed position), a reverse gear position (rear drive position) and a neural position, by engaging actions of a corresponding combination of the two frictional coupling devices selected from the above-described switching clutch C0, first clutch C1, second clutch C2, switching brake B0, first brake B1, second brake B2 and third brake B3, as indicated in the table of FIG. 2. The above-indicated positions have respective speed ratios $\gamma$ (input shaft speed $N_{IN}$/output shaft speed $N_{OUT}$) which change as geometric series. The power distributing mechanism 16 is provided with the switching clutch C0 and the switching brake B0 one of which is engaged to place the differential portion 11 in the continuously-variable shifting state in which the differential portion 11 is operable as a continuously variable transmission, or in the step-variable shifting state (fixed-speed-ratio shifting state) in which the differential portion 11 is operable as a step-variable transmission having a fixed speed ratio or ratios. In the present transmission mechanism 10, therefore, the differential portion 11 placed in the fixed-speed-ratio shifting state by the engaging action of one of the switching clutch C0 and switching brake B0 cooperates with the automatic transmission portion 20 to constitute a step-variable transmission device, while the differential portion 11 placed in the continuously-variable shifting state with the switching clutch C0 and switching brake B0 being both held in the released state cooperates with the automatic transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the differential portion 11 is selectively placed in one of its step-variable and continuously-variable shifting states. It is noted that the rotating speed $N_{OUT}$ of the output shaft 22 is detected by a speed sensor a part of which is provided for the output shaft 22. This speed sensor is capable of detecting the direction of rotation of the output shaft 22, as well as the rotating speed $N_{OUT}$, so that the direction of running of the hybrid vehicle can be detected by the speed sensor.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is establishing by releasing all of the clutches C0, C1, C2 and brakes B0, B1, B2, B2, B3.

Where the transmission mechanism 10 functions as the continuously-variable transmission with the differential portion 11 placed in its continuously-variable shifting state, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in a selected gear position, namely, the rotating speed of the power transmitting member 18 is continuously changed, so that the speed ratio of the power transmitting system when the automatic transmission portion 20 is placed in the selected gear position is continuously variable over a predetermined range. Accordingly, the overall speed ratio γT of the transmission mechanism 10 is continuously variable.

Figure 3:
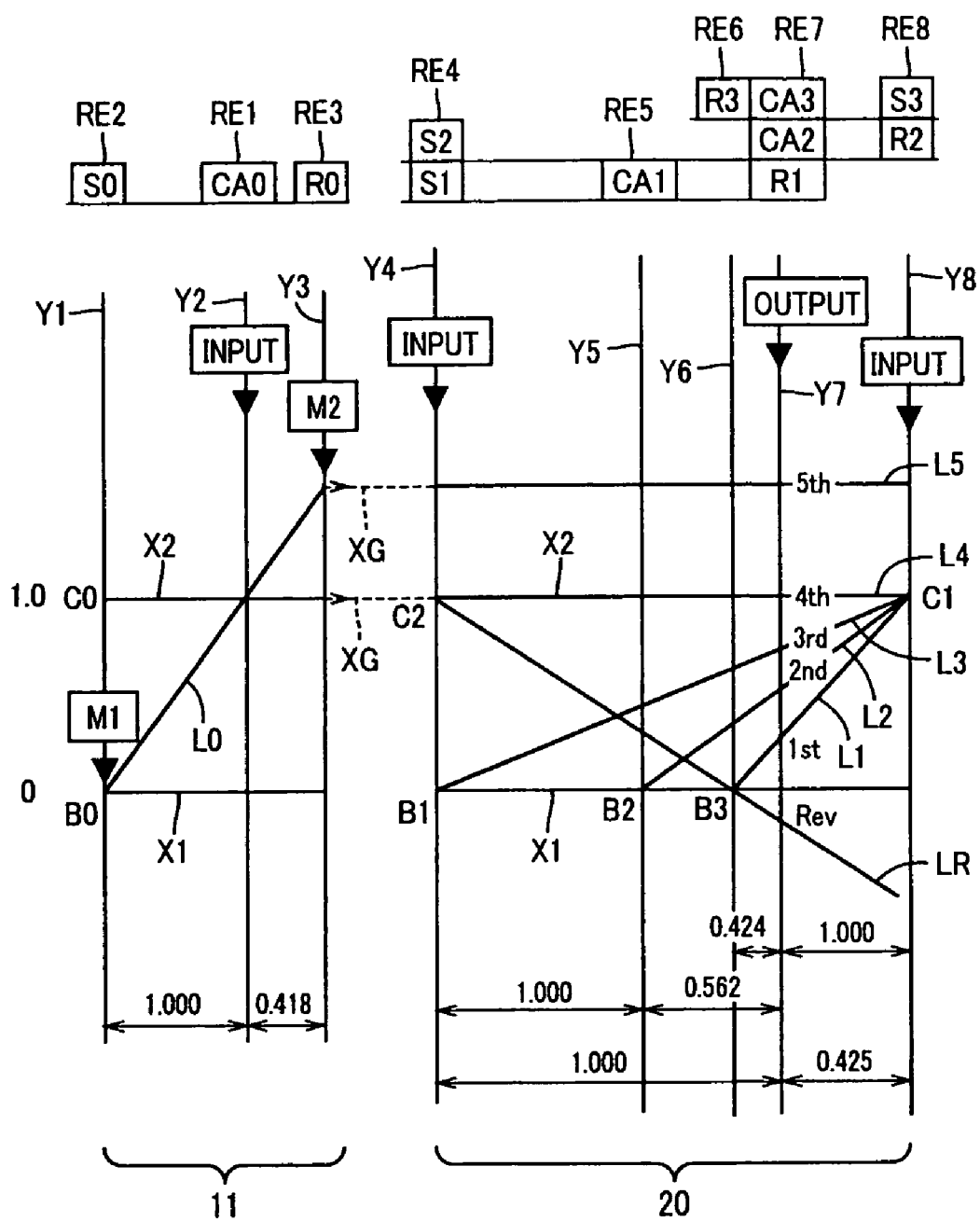
FIG. 3 is a collinear chart indicating relative rotating speeds of the hybrid vehicle power transmitting system of FIG. 1 operated in the step-variable shifting state, in different gear positions of the power transmitting system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion (automatic transmission portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the sun gear S0, a first rotary element (first element) RE1 in the form of the carrier CA0, and a third rotary element (third element) RE3 in the form of the ring gear R0. The distances between the adjacent ones of the vertical lines Y1, Y2 and Y3 are determined by the gear ratio ρ0 of the planetary gear set 24. That is, the distance between the vertical lines Y1 and Y2 corresponds to "1", while the distance between the vertical lines Y2 and Y3 corresponds to the gear ratio ρ0. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the carrier CA1, a sixth rotary element (sixth element) RE6 in the form of the third ring gear R3, a seventh rotary element (seventh element) RE7 in the form of the first ring gear R1 and second and third carriers CA2, CA3 that are integrally fixed to each other, and an eighth rotary element (eighth element) RE8 in the form of the second ring gear R2 and third sun gear S3 integrally fixed to each other. The distances between the adjacent ones of the vertical lines are determined by the gear ratios ρ1, ρ2 and ρ3 of the first, second and third planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ0. In the automatic transmission portion 20, the distance between the sun gear and carrier of each of the first, second and third planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (carrier CA0) of the planetary gear set 24 is integrally fixed to the input shaft 14 (engine 8) and selectively connected to the second rotary element RE2 (sun gear S0) through the switching clutch C0, and this second rotary element RE2 is fixed to the first electric motor M1 and selectively fixed to the casing 12 through the switching brake B0, while the third rotary element RE3 (ring gear R0) is fixed to the power transmitting member 18 and the second electric motor M2, so that a rotary motion of the input shaft 14 is transmitted (input) to the automatic transmission portion 20 through the power transmitting member 18. A relationship between the rotating speeds of the sun gear S0 and the ring gear R0 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the rotating speed of the sun gear S0 represented by a point of intersection between the straight line L0 and the vertical line Y1 is raised or lowered by controlling the operating speed of the first electric motor M1, so that the rotating speed of the carrier CA0 represented by the straight line L0 and the vertical line Y2 is raised or lowered, if the rotating speed of the ring gear R0 determined by the vehicle speed V and represented by a point of intersection between the straight line L0 and the vertical line Y3 is substantially held constant.

When the switching clutch C0 is engaged, the sun gear S0 and the carrier CA0 are connected to each other, and the power distributing mechanism 16 is placed in the first non-differential state in which the above-indicated three rotary elements RE1, RE2, RE3 are rotated as a unit, so that the straight line L0 is aligned with the horizontal line X2, so that the power transmitting member 18 is rotated at a speed equal to the engine speed $N_E$. When the switching brake B0 is engaged, on the other hand, the sun gear S0 is fixed to the casing 12, and the power distributing mechanism 16 is placed in the second non-differential state in which the power distributing mechanism 16 functions as a speed-increasing mechanism, so that the straight line L0 is inclined in the state indicated in FIG. 3, whereby the rotating speed of the ring gear R0 represented by a point of intersection between the straight lines L0 and Y3, that is, the rotating speed of the power transmitting member 18 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22 and the second electric motor M2, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the differential portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
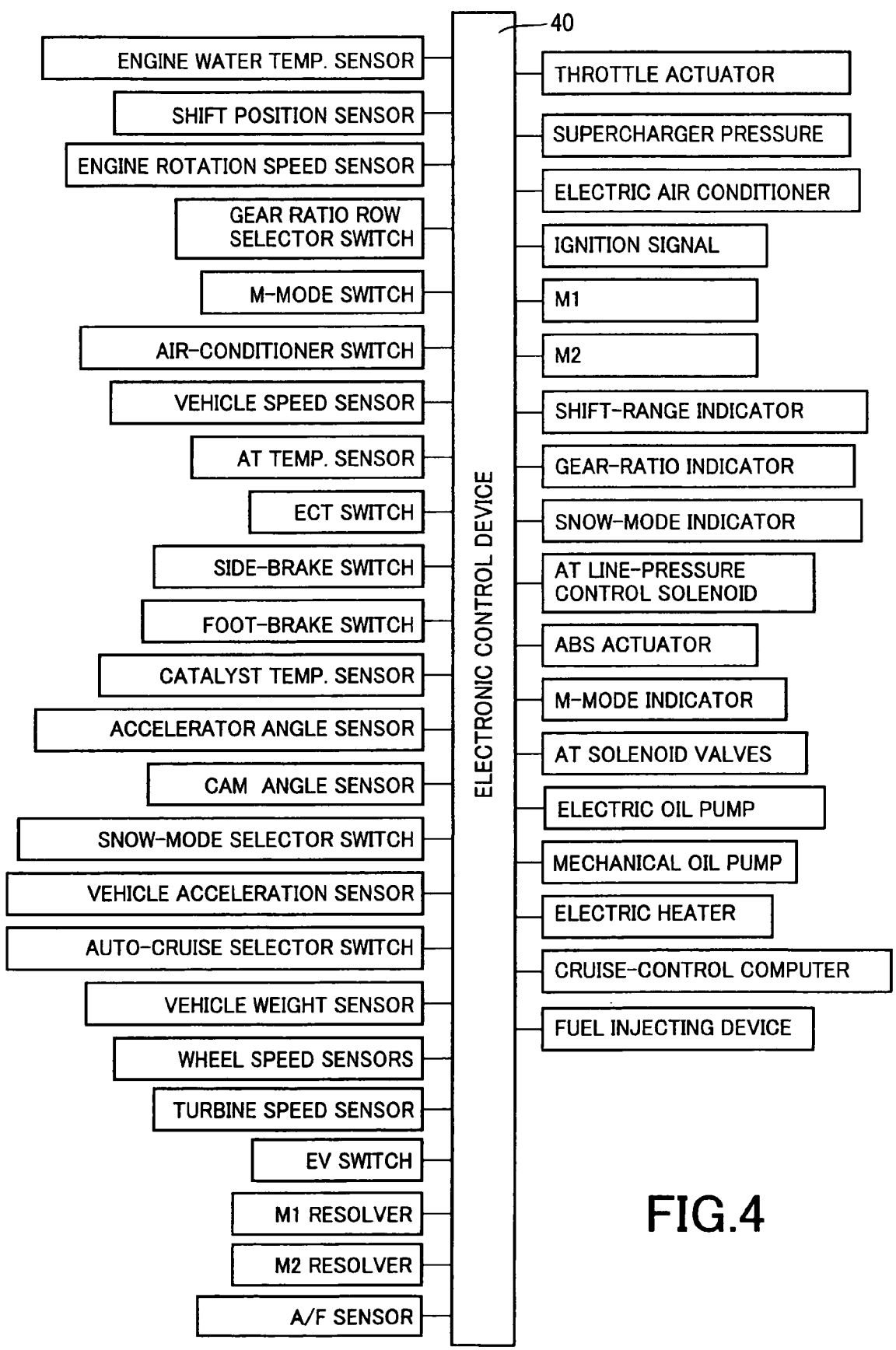
FIG. 4 is a view indicating input and output signals of an control apparatus in the form of an electronic control device according to one embodiment of this invention to control the power transmitting system of FIG. 1.

FIG. 4 indicates signals received by an electronic control device 40 which is provided to control the transmission mechanism 10 constituting a part of the hybrid vehicle power transmitting system, and the control apparatus constructed according to the present embodiment of the invention. FIG. 4 also indicates signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position SP of a shift lever 49 (shown in FIG. 5); a signal indicative of an operating speed $N_{M1}$ of the first electric motor M1; a signal indicative of an operating speed $N_{M2}$ of the second electric motor M2; a signal indicative of the operating speed $N_E$ of the engine 8; a signal indicative of a value indicating gear ratios of a selected group of forward-drive positions of the transmission mechanism 10; a signal indicative of an M mode (manual shifting drive mode); a signal indicative of an operated state of an air conditioner; a signal indicative of a vehicle speed V corresponding to the rotating speed $N_{OUT}$ of the output shaft 22; a signal indicative of a temperature of a working oil or fluid of the automatic transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an air/fuel (A/F) ratio of an air-fuel mixture of the engine 8; and a signal indicative of an opening angle $\theta_{TH}$ of an electronic throttle valve 96.

The electronic control device 40 is further arranged to generate various signals such as: control signals to be applied to an engine output control device 43 (shown in FIG. 6) to control the output of the engine 8, such as a drive signal to drive a throttle actuator 97 for controlling the opening angle $\theta_{TH}$ of the above-indicated electronic throttle valve 96 disposed in an intake pipe 95 of the engine 8, a signal to control an amount of injection of a fuel by a fuel injecting device 98 into the suction pipe 95 or cylinders of the engine 8, a signal to be applied to an ignition device 99 to control the ignition timing of the engine 8, and a signal to adjust a supercharger pressure of the engine 8; a signal to operate the electric air conditioner; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 (shown in FIG. 6) provided to control the hydraulic actuators of the hydraulically operated frictional coupling devices of the differential portion 11 and automatic transmission portion 20; a signal to operate an electric oil pump used as a hydraulic pressure source for the hydraulic control unit 42; a signal to drive an electric heater; and a signal to be applied to a cruise-control computer.

FIG. 5 shows an example of a manually operable shifting device in the form of a shifting device 48. The shifting device 48 includes the above-described shift lever 49, which is disposed laterally adjacent to an operator's seat, for example, and which is manually operated to select one of the plurality of shift positions SP.

The shift positions SP consist of: a parking position P for placing the transmission mechanism 10 (more precisely, the automatic transmission portion 20) in a neutral state in which the power transmitting path is disconnected and in which the output shaft 22 of the automatic transmission portion 20 is locked; a reverse R for driving the vehicle in the rearward direction; a neutral position N for placing the transmission mechanism 10 in the neutral state; an automatic forward-drive shifting position D; and a manual forward-drive shifting position M. When the shift lever 49 is operated to the automatic forward-drive shifting position D, the transmission mechanism 10 is placed in an automatic shifting mode in which the overall speed ratio γT is automatically changed. When the shift lever 49 is operated to the manual forward-drive shifting position M, the transmission mechanism 10 is placed in a manual shifting mode in which the highest gear position to which the automatic transmission portion 20 is automatically shiftable can be selected.

When the shift lever 49 is operated to a selected one of the shift positions SP, the hydraulic control unit 42 is electrically switched to establish one of the reverse-drive position R, neutral position N and first through fifth gear positions that are indicated in the table of FIG. 2.

The above-indicated parking position P and the neutral position N of the shift lever 49 are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual operation of the shift lever 49 from the parking position P or neutral position N to the reverse-drive position R causes the second clutch C2 to be engaged for switching the power transmitting path in the automatic transmission portion 20 from the power cut-off state to the power transmitting state. A manual operation of the shift lever 49 from the neutral position N to the automatic forward-drive position D causes at least the first clutch C1 to be engaged for switching the power transmitting path in the automatic transmission portion 20 from the power-cut-off state to the power transmitting state. Further, a manual operation of the shift lever 49 from the reverse-drive position R to the parking position P or neutral position N causes the second clutch C2 to be released for switching the power transmitting path in the automatic transmission portion 20 from the power transmitting state to the power cut-off state. A manual operation of the shift lever 49 from the automatic forward-drive shifting position D to the neutral position N causes the first and second clutches C1, C2 to be released for switching the power transmitting path in the automatic transmission portion 20 from the power transmitting state to the power cut-off state.

Figure 6:
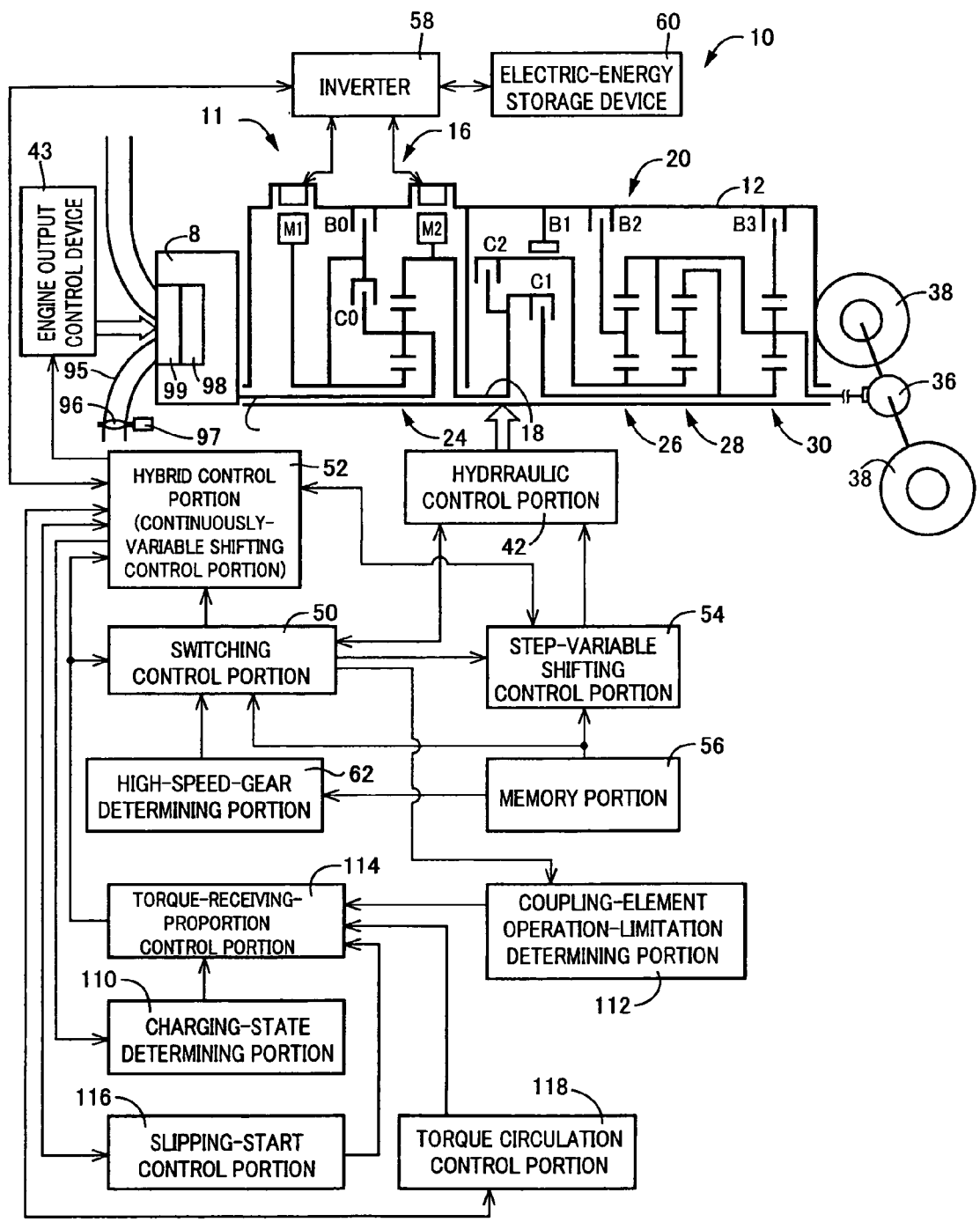
FIG. 6 is a functional block diagram illustrating major control functions of the electronic control device of FIG. 4.

FIG. 6 is a functional block diagram for explaining major control functions of the electronic control device 40, which includes a switching control portion 50, a hybrid control portion 52, a step-variable shifting control portion 54, a memory 56, a high-speed-gear determining portion 62, a charging-state determining portion 110, a coupling-element operation-limitation determining portion 112, a torque-receiving-proportion control portion 114, a slipping-start control portion 116 and a torque circulation control portion 118. The step-variable shifting control portion 54 functions as a shifting control portion operable to control shifting actions of the automatic transmission portion 20. For example, the step-variable shifting control portion 54 is arranged to determine whether a shifting action of the automatic transmission portion 20 should take place, that is, to determine the gear position to which the automatic transmission portion 20 should be shifted. This determination is made on the basis of a condition of the vehicle in the form of the vehicle speed V and a required output torque $T_{OUT}$ of the automatic transmission portion 20, and according to a shifting boundary line map (shifting control map or relation) which is stored in the memory 56 and which represents shift-up boundary lines indicated by solid lines in FIG. 7 and shift-down boundary lines indicated by one-dot chain lines in FIG. 7. The step-variable shifting control portion 54 generates commands (shifting commands or hydraulic control command) to be applied to the hydraulic control unit 42, to selectively engage and release the respective two hydraulically operated frictional coupling devices (except the switching clutch C0 and brake B0), for establishing the determined gear position of the automatic transmission portion 20 according to the table of FIG. 2.

The hybrid control portion 52 is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission, while the transmission mechanism 10 is placed in the continuously-variable shifting state, that is, while the differential portion 11 is placed in the differential state. For instance, the hybrid control portion 52 calculates a target (required) vehicle output at the present running speed V of the vehicle, on the basis of the operating amount $A_{CC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control portion 52 calculates a target output of the engine 8 to obtain the calculated target total vehicle output, while taking account of a power transmission loss, a load acting on various devices of the vehicle, an assisting torque generated by the second electric motor M2, etc. The hybrid control portion 52 controls the speed $N_E$ and torque $T_E$ of the engine 8, so as to obtain the calculated target engine output, and the amount of generation of the electric energy by the first electric motor M1.

The hybrid control portion 52 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electrically controlled continuously-variable transmission, for optimum coordination of the engine speed $N_E$ for efficient operation of the engine 8, and the rotating speed of the power transmitting member 18 determined by the vehicle speed V and the selected gear position of the transmission portion 20. That is, the hybrid control portion 52 determines a target value of the overall speed ratio γT of the transmission mechanism 10, so that the engine 8 is operated according to a stored highest-fuel-economy curve (fuel-economy map or relation) stored in memory means. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 52 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid control portion 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the power transmitting system is provided with an electric path through which an electric energy generated by conversion of a portion of a drive force of the engine 8 is converted into a mechanical energy. It will be understood that the electric-energy storage device 60 is chargeable with an electric energy supplied from the first or second electric motor M1, M2, and operable to supply an electric energy stored therein to the first or second electric motor M1, M2.

The hybrid control portion 52 includes engine output control means functioning to control the engine 8, so as to provide a required output, by controlling the throttle actuator 97 to open and close the electronic throttle valve 96, and controlling an amount and time of fuel injection by the fuel injecting device 98 into the engine 8, and/or the timing of ignition of the igniter by the ignition device 99, alone or in combination. For instance, the hybrid control portion 52 is basically arranged to control the throttle actuator 97 on the basis of the operating amount $A_{CC}$ of the accelerator pedal (manually operable vehicle accelerating member) and according to a predetermined stored relationship (not shown) between the operating amount $A_{CC}$ and the opening angle $\theta_{TH}$ of the electronic throttle valve 96 such that the opening angle $\theta_{TH}$ increases with an increase of the operating amount $A_{CC}$.

Figure 7:
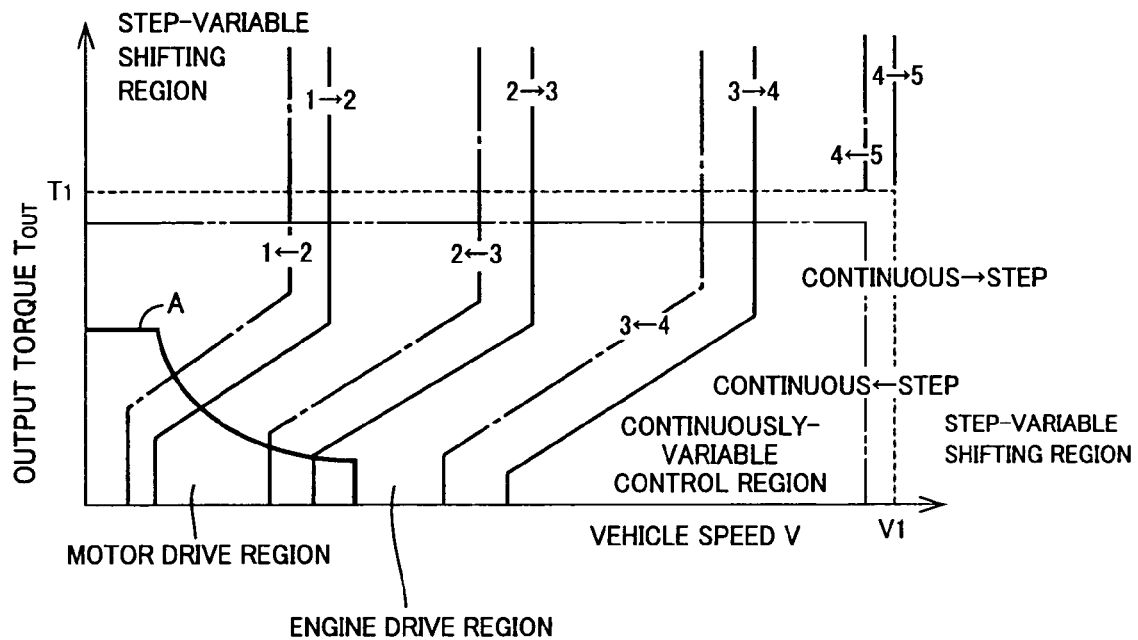
FIG. 7 is a view illustrating an example of a stored shifting boundary line map used for determining a shifting action of an automatic transmission portion, an example of a stored switching boundary line map used for switching the shifting state of a transmission mechanism of the power transmitting system, and an example of a stored drive-power-source switching boundary line map defining a boundary line between an engine drive region and a motor drive region for switching between an engine drive mode and a motor drive mode, in the same two-dimensional coordinate system defined by control parameters in the form of a running speed and an output torque of the vehicle, such that those maps are related to each other.

Solid line A in FIG. 7 represents an example of a boundary line defining an engine-drive region and a motor-drive region, for switching the vehicle drive power source for starting and driving the vehicle, between the engine 8 and the second electric motor M2. In other words, the vehicle drive mode is switchable between an "engine drive mode" corresponding to the engine-drive region in which the vehicle is started and driven with the engine 8 used as the vehicle drive power source, and the "motor drive mode" corresponding to the motor-drive region in which the vehicle is driven with the second electric motor M2 used as the vehicle drive power source. A predetermined stored relationship representing the boundary line (solid line A) of FIG. 7 for switching between the engine drive mode and the motor drive mode is an example of a drive-power-source switching boundary line map (drive-power-source map) in a two-dimensional coordinate system defined by control parameters in the form of the vehicle speed V and a drive-force-related value in the form of the output torque $T_{OUT}$. This drive-power-source switching boundary line map is stored in the memory 56, together with the shifting boundary line map (shifting map) indicated by solid lines and one-dot chain lines in FIG. 7.

The hybrid control portion 52 determines whether the vehicle condition is in the motor-drive region or engine-drive region, and establishes the motor drive mode or engine drive mode. This determination is made on the basis of the vehicle condition represented by the vehicle speed V and the required output torque $T_{OUT}$, and according to the drive-power-source switching boundary line map of FIG. 7. As is understood from FIG. 7, the motor drive mode is generally established by the hybrid control portion 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low.

For reducing a dragging of the engine 8 in its non-operated state and improving the fuel economy in the motor drive mode, the hybrid control portion 52 is arranged to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled so as to be freely rotated to have a negative speed $N_{M1}$.

The hybrid control portion 52 is further capable of performing a so-called "drive-force assisting" operation (torque assisting operation) to assist the engine 8, by supplying the second electric motor M2 with an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine drive mode.

The hybrid control portion 52 is arranged to hold the engine 8 in an operated state owing to the electric CVT function of the differential portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control portion 52 is further arranged to hold the engine speed $N_E$ at a desired value owing to the electric CVT function of the differential portion 11, by controlling the first electric motor speed $N_{M1}$ and/or second electric motor speed $N_{M2}$, irrespective of whether the vehicle is stationary or running. For example, the hybrid control portion 52 is arranged to raise the engine speed $N_E$ by raising the first electric motor speed $N_{M1}$ while the second electric motor speed $N_{M2}$ determined by the vehicle speed V is held substantially constant, as is apparent from the collinear chart of FIG. 3.

The high-speed-gear determining portion 62 is arranged to determine whether the gear position to which the transmission mechanism 10 should be shifted on the basis of the vehicle condition and according to the shifting boundary line map stored in the memory 56 and indicated in FIG. 6 by way of example is a high-speed-gear position, for example, the fifth gear position. This determination is made by determining whether the gear position selected by the step-variable shifting control portion 54 is the fifth gear position or not, for determining which one of the switching clutch C0 and brake B0 should be engaged to place the transmission mechanism 10 in the step-variable shifting state.

The switching control portion 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control portion 50 is arranged to determine whether the shifting state of the transmission mechanism 10 (differential portion 11) should be changed, on the basis of the vehicle condition represented by the vehicle speed V and the required output torque $T_{OUT}$ and according to the switching boundary line map (switching control map or relation) stored in the memory 56 and indicated by two-dot chain line in FIG. 7 by way of example, namely, whether the vehicle condition is in a continuously-variable shifting region (a differential region) for placing the transmission mechanism 10 in the continuously-variable shifting state, or in a step-variable shifting region (a non-differential region) for placing the transmission mechanism 10 in the step-variable shifting state. The switching control portion 50 places the transmission mechanism 10 in the continuously-variable shifting state or step-variable shifting state, depending upon whether the vehicle condition is in the continuously-variable shifting region or in the step-variable shifting region.

Described in detail, when the switching control portion 50 determines that the vehicle condition is in the step-variable shifting region, the switching control portion 50 disables the hybrid control portion 52 to implement a hybrid control or continuously-variable shifting control, and enables the step-variable shifting control portion 54 to implement a predetermined step-variable shifting control in which the transmission portion 20 is automatically shifted according to the shifting boundary line map stored in the memory 56 and indicated in FIG. 6 by way of example. FIG. 2 indicates the combinations of the engaging actions of the hydraulically operated frictional coupling devices C0, C1, C2, B0, B1, B2 and B3, which are stored in the memory 56 and which are selectively used for automatic shifting of the automatic transmission portion 20. In the step-variable shifting state, the transmission mechanism 10 as a whole constituted by the differential portion 11 and the automatic transmission portion 20 functions as a so-called step-variable automatic transmission which is automatically shifted according to the table of FIG. 2.

When the high-speed-gear determining portion 62 has determined that the transmission mechanism 10 should be shifted to the fifth gear position, the switching control portion 50 commands the hydraulic control unit 42 to release the switching clutch C0 and engage the switching brake B0, for enabling the differential portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining portion 62 has not determined that the transmission mechanism 10 should be shifted to the fifth gear position, the switching control portion 50 commands the hydraulic control unit 42 to engage the switching clutch C0 and release the switching brake B0, for enabling the differential portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control portion 50, the differential portion 11 operable as the auxiliary transmission is placed in a selected one of two gear positions under the control of the switching control portion 50 while the automatic transmission portion 20 connected in series to the differential portion 11 functions as a step-variable transmission, so that the transmission mechanism 10 as a whole functions as the so-called step-variable automatic transmission.

When the switching control portion 50 has determined that the vehicle condition is in the continuously-variable shifting region for placing the transmission mechanism 10 in the continuously-variable shifting state, the switching control portion 50 commands the hydraulic control unit 42 to release both of the switching clutch C0 and brake B0, for placing the differential portion 11 in the continuously-variable shifting state. At the same time, the switching control portion 50 enables the hybrid control portion 52 to implement the hybrid control, and commands the step-variable shifting control portion 54 to select and hold a predetermined one of the gear positions, or to permit the automatic transmission portion 20 to be automatically shifted according to the shifting boundary line map stored in the memory 56 and indicated in FIG. 7 by way of example. In the latter case, the variable-step shifting control portion 54 implements the automatic shifting control by suitably selecting the combinations of the operating states of the frictional coupling devices indicated in the table of FIG. 2, except the combinations including the engagement of the switching clutch C0 and brake B0. Thus, the differential portion 11 switched to the continuously-variable shifting state under the control of the switching control portion 50 functions as the continuously variable transmission while the automatic transmission portion 20 connected in series to the differential portion 11 functions as the step-variable transmission, so that the transmission mechanism 10 provides a sufficient vehicle drive force, such that the input speed $N_{IN}$ of the automatic transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the automatic transmission portion 20 is continuously variable across the adjacent gear positions, whereby the total speed ratio γT of the transmission mechanism 10 is continuously variable.

The maps of FIG. 7 will be described in detail. The shifting boundary line map (shifting control map or relation) shown in FIG. 7 by way of example and stored in the memory 56 is used for determining whether the automatic transmission portion 20 should be shifted, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 7 represent the upper vehicle-speed limit V1 and the upper output-torque limit T1 which are used for the switching control portion 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the automatic transmission portion 20 above which it is determined that the hybrid vehicle is in a high-output running state. The output torque $T_{OUT}$ is an example of the drive-force-related value which relates to the drive force of the hybrid vehicle. FIG. 7 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 7 constitute the stored switching pattern or boundary line map (switching control map or relation) used by the switching control portion 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control portion 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the automatic transmission portion 20 has exceeded the upper limit T1.

The switching control portion 50 may be arranged to place the transmission mechanism 10 in the step-variable shifting state even when the vehicle condition is in the continuously-variable shifting region, upon detection of any functional failure or deterioration of the electric components such as the electric motors which are operable to operate the differential portion 11 as the electrically controlled continuously variable transmission. Those electric components include components such as the first electric motor M1, second electric motor M2, inverter 58, electric-energy storage device 60 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the automatic transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 8:
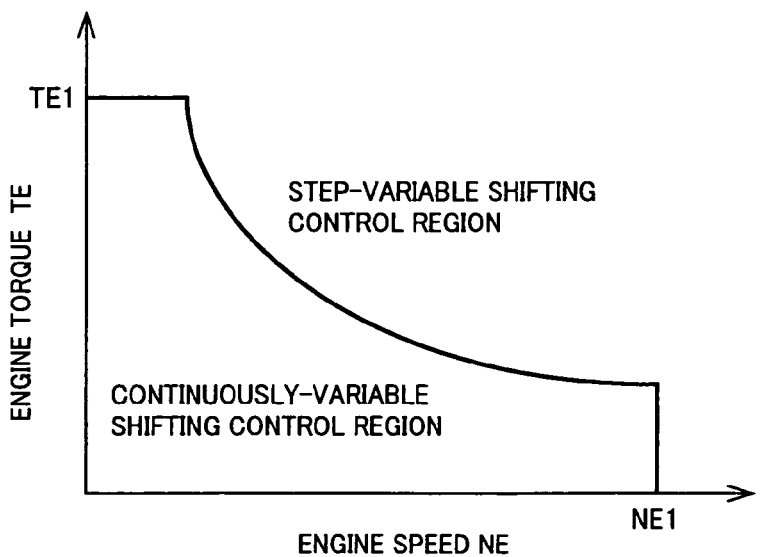
FIG. 8 is a view illustrating a stored switching pattern or relationship defining a boundary line between a continuously-variable shifting region and a step-variable shifting region, which relationship is used to map the boundary line of the switching boundary line map defining the continuously-variable and step-variable shifting regions which are indicated by broken lines in FIG. 7.

Referring to FIG. 8, there is shown a switching pattern or boundary line map (switching control map or relation) which is stored in the memory 56 and which defines engine-output lines serving as a boundary line used by the switching control portion 50 to determine whether the vehicle condition is in the step-variable or continuously-variable shifting region. These engine-output lines are defined by control parameters in the form of the engine speed $N_E$ and the engine torque $N_T$. The switching control portion 50 may use the switching boundary line map of FIG. 8 in place of the switching boundary line map of FIG. 7, to determine whether the vehicle condition is in the continuously-variable or step-variable shifting region, on the basis of the engine speed $N_E$ and engine torque $T_E$. The switching boundary line map of FIG. 7 may be based on the switching boundary line map of FIG. 7. In other words, the broken lines in FIG. 7 may be determined on the basis of the relation (map) of FIG. 8, in the two-dimensional coordinate system defined by the control parameters in the for of the vehicle speed V and the output torque $T_{OUT}$.

The step-variable shifting region defined by the switching boundary line map of FIG. 7 is defined as a high-torque drive region in which the output torque $T_{OUT}$ is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque $T_E$ is not lower than the predetermined upper limit $T_{E1}$, or a high-speed drive region in which the engine speed $N_E$ is not lower than the predetermined threshold value $N_{E1}$, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary line of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 functions as the electrically controlled continuously variable transmission. In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the power transmitting system including those electric motors. According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the automatic transmission portion 20, assuring a comfortable rhythmic change of the engine speed $N_E$ as the transmission portion 20 is shifted up.

Referring back to the functional block diagram of FIG. 6, the charging-state determining portion 110 is configured to detect an amount of electric energy SOC stored in the electric-energy storage device 60, and determine whether the detected amount of electric energy SOC is smaller than a predetermined upper limit. When the amount of electric energy SOC stored in the electric-energy storage device 60 is smaller than the upper limit, that is, when the electric-energy storage device 60 can further store an electric energy, the first electric motor M1 can be operated to generate an electric energy, so that the first electric motor M1 alone can generate a reaction torque. When the amount of electric energy SOC is not smaller than the upper limit, on the other hand, the electric-energy storage device 60 can no longer store a large amount of electric energy and may be overcharged if the first electric motor M1 generates an electric energy. The upper limit of the electric energy amount SOC is determined by experimentation, as a maximum electric energy amount at which the electric-energy storage device 60 is sufficiently charged but not overcharged and can further store some amount of an electric energy.

The coupling-element operation-limitation determining portion 112 is configured to determine whether the operation of the switching clutch C0 or brake B0 is limited. For instance, the operation of the switching clutch C0 or brake B0 is limited when the temperature of the working fluid in the transmission mechanism 10 is lower than a predetermined lower limit, or when the operation of the control valve provided to control the engaging pressure of the switching clutch C0 or brake B0 is limited. When the operation of the switching clutch C0 or brake B0 is limited, the torque capacity of the switching clutch C0 or brake B0 is limited, that is, kept below a predetermined upper limit.

The torque-receiving-proportion control portion 114 is configured to control a proportion of torque values of a total reaction torque of the differential portion 11, which torque values are received by the first electric motor M1 and the switching clutch C0 or brake B0, so that the balance of amounts of charging and discharging of the electric-energy storage device 60 is optimized to prevent overcharging of the electric-energy storage device 60. Described in detail, the torque-receiving-proportion control portion 114 is configured to increase a torque receiving ratio of the switching clutch C0 or brake B0, with an increase of a difference of an amount of electric energy consumed by the second electric motor M2 from an amount of electric energy generated by the first electric motor M1, that is, configured to increase the ratio of the torque value received by the switching clutch C0 or brake B0 with an increase of the amount of electric energy generated by the first electric motor M1 minus the amount of electric energy consumed by the second electric motor M2. It will be understood that the switching clutch C0 is a coupling device operable to connect at least two coupling elements (sun gear S0 and carrier CA0 of the planetary gear set 24) of the differential portion 11, while the switching brake B0 is a coupling device operable to limit the rotary motion of the rotary element (sun gear S0) of the differential portion 11 connected to the first electric motor M1.

The required output torque $T_{OUT}$ of the output shaft 22 of the automatic transmission portion 20 is calculated on the basis of the operating amount $A_{CC}$ of the accelerator pedal, and the required input torque $T_{IN}$ of the automatic transmission portion 20 is calculated on the basis of the speed ratio of the automatic transmission portion 20. The speed $N_E$ and torque $T_E$ of the engine 8 are controlled to obtain the calculated required input torque $T_{IN}$, and to control the amount of electric energy generated by the first electric motor M1, that is, the amount of reaction torque received by the first electric motor M1.

The switching brake B0 and clutch C0 placed in their slipping state can receive the reaction torque based on the engine torque $T_E$, which reaction torque is transmitted to the carrier CA0 of the differential portion 11. When the switching brake B0 is placed in the slipping state, the rotating speed of the sun gear S0 of the differential portion 11 is gradually lowered to zero, and the rotary motion (drive force) of the engine 8 is gradually transmitted to the power transmitting member 18 (ring gear R0). In other words, the switching brake B0 placed in the slipping state receives a portion of the reaction torque acting on the sun gear S0 of the differential portion 11, so that the drive force is transmitted to the power transmitting member 18. When the switching clutch C0 is placed in the slipping state, the rotary elements of the differential portion 11 are gradually rotated as a unit, so that the rotary motion (drive force) of the engine 8 is gradually transmitted to the power transmitting member 18. In other words, the switching clutch C0 placed in the slipping state receives a portion of the reaction torque acting on the sun gear S0, so that the drive force is transmitted to the power transmitting member 18. Since the reaction torque received by the switching brake B0 or clutch C0 increases as the amount of slipping of the switching brake B0 or clutch C0 is increased, the torque-receiving-proportion control portion 114 is able to control or change the proportion of the reaction torque values received by the first electric motor M1 and the switching brake B0 or clutch C0, by controlling the amount of slipping of the switching brake B0 or clutch C0.

Figure 9:
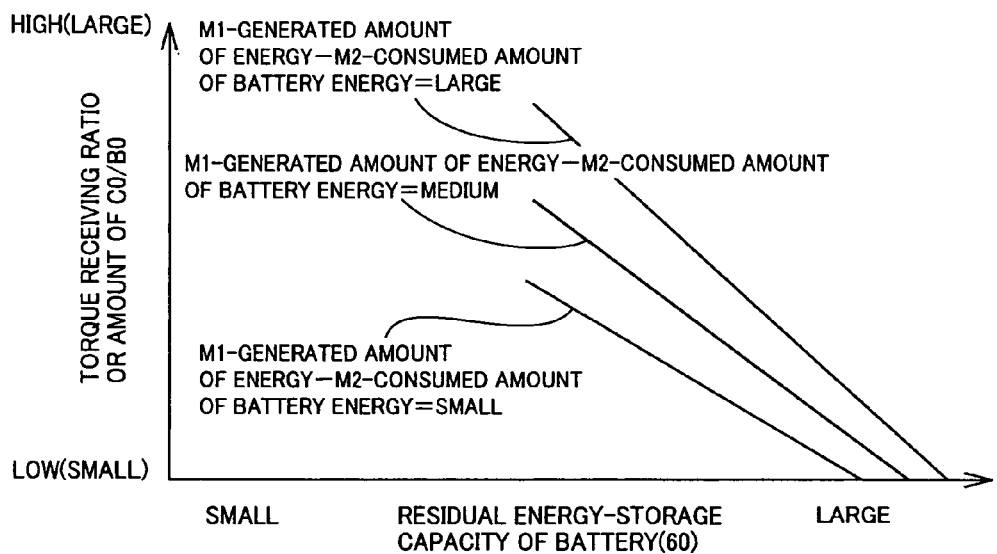
FIG. 9 is a view indicating relationships between a residual energy-storage capacity of an electric-energy storage device, and a toque receiving ratio of a switching clutch or brake with respect to a total reaction torque acting on a sun gear of a planetary gear set of a differential portion of the power transmitting system.

The torque-receiving-proportion control portion 114 changes the proportion of the reaction torque values received by the first electric motor M1 and the switching brake B0 or clutch C0, on the basis of the electric energy amount SOC stored in the electric-energy storage device 60, which is detected by the charging-state determining portion 110. The graph of FIG. 9 indicates relationships between the residual energy-storage capacity of the electric-energy storage device 60, and the toque receiving ratio of the switching clutch C0 or brake B0 with respect to the total reaction torque acting on the sun gear S0 of the planetary gear set 24 of the differential portion 11. In the graph, the residual energy-storage capacity of the electric-energy storage device 60 (the amount of electric energy that can be further stored in the electric-energy storage device 60) is taken along the horizontal axis, while the ratio of the torque value of the total reaction force, which torque value is received by the switching clutch C0 or brake B0, is taken along the vertical axis. As indicated in FIG. 9, the slipping amount of the switching clutch C0 or brake B0 is controlled to reduce the torque receiving ratio or amount of the switching clutch C0 or brake B0 with an increase of the residual energy-storage capacity of the electric-energy storage device 60. An increase of the residual energy-storage capacity of the electric-energy storage device 60 means an increase of the amount of electric energy that can be further stored in the electric-energy storage device 60, and a decrease of the required limitation of generation of the electric energy by the first electric motor M1, and therefore permits a decrease of the torque receiving ratio or amount of the switching clutch B0 or clutch C0 and an increase of the electric energy that can be generated by the first electric motor M1, that is, an increase of the reaction torque value received by the first electric motor M1. On the other hand, a decrease of the residual energy-storage capacity of the electric-energy storage device 60 means a decrease of the amount of electric energy that can be further stored in the electric-energy storage device 60, and a decrease of the required limitation of generation of the electric energy by the first electric motor M1, so that an increase of the amount of electric energy generated by the first electric motor M gives rise to a risk of overcharging of the electric-energy storage device 60. When the residual energy-storage capacity of the electric-energy storage device 60 is relatively small, therefore, the torque receiving ratio or amount of the switching brake B0 or clutch C0 is increased to reduce the reaction torque received by the first electric motor M1, that is, to reduce the amount of electric energy generated by the first electric motor M1. In other words, the ratio or amount of the reaction torque received by the switching brake B0 or clutch C0 is increased with a decrease of the residual energy-storage capacity of the electric-energy storage device 60, to reduce the amount of electric energy generated by the first electric motor M1.

The torque-receiving-proportion control portion 114 is further configured to increase the torque receiving ratio or amount of the switching brake B0 or clutch C0 with an increase of the difference of the amount of electric energy consumed by the second electric motor M2 from the amount of electric energy generated by the first electric motor M1, that is, with an increase of the electric energy amount generated by the first electric motor M1 minus the electric energy amount consumed by the second electric motor M2, as also indicated in the graph of FIG. 9. The amount of electric energy consumed by the second electric motor M2 is optimized under the control of the hybrid control portion 52, so that an increase of the above-indicated difference causes the amount of electric energy generated by the first electric motor M1 and stored in the electric-energy storage device 60, to become larger than the amount of electric energy consumed by the operation of the second electric motor M1, so that the amount of charging of the electric-energy storage device 60 is increased. In this case, the torque-receiving-proportion control portion 114 increases the torque receiving ratio or amount of the switching brake B0 or clutch C0, for thereby reducing the electric energy amount generated by the first electric motor M1 and stored in the electric-energy storage device 60.

The torque-receiving-proportion control portion 114 is further configured to detect a charging amount $W_{IN}$ and a discharging amount $W_{OUT}$ of the electric-energy storage device 60 per unit time, and is able to control the torque receiving ratio or amount of the switching brake B0 or clutch C0 so as to prevent the charging amount $W_{IN}$ or discharging amount $W_{OUT}$ per unit time from exceeding a predetermined upper limit. For example, the torque-receiving-proportion control portion 114 increases the torque receiving ratio or amount of the switching brake B0 or clutch C0 to reduce the electric energy amount M1 generated by the first electric motor M1 for reducing the charging amount $W_{IN}$ per unit time when the charging amount $W_{IN}$ per unit time exceeds the upper limit, and reduces the torque receiving ratio or amount of the switching brake B0 or clutch C0 to increase the electric energy amount generated by the first electric motor M1 for reducing the discharging amount $W_{OUT}$ per unit time when the discharging amount $W_{OUT}$ exceeds the upper limit.

When the coupling-element operation-limitation determining portion 112 has determined that the torque capacity of the switching clutch C0 or brake B0 is limited, the torque-receiving-proportion control portion 114 commands the hybrid control portion 52 to reduce the torque $T_E$ of the engine 8 by an amount that permits the first electric motor M1 or the switching brake B0 or clutch C0 to receive the reaction torque corresponding to the engine torque $T_E$.

Referring back to the functional block diagram of FIG. 6, the slipping-start control portion 116 is configured to place the switching clutch C0 or brake B0 in the slipping state when the vehicle is started by the engine 8 operated as the vehicle drive power source. Described in detail, the slipping-start control portion 116 implements adequate starting of the vehicle with the engine 8 while the switching clutch C0 or brake B0 is placed in the slipping state, rather than normal starting of the vehicle by the electric motor M1 or M2 or the engine 8 under the control of the hybrid control portion 52, where the normal starting of the vehicle is not possible due to limitation of the output of the electric motor M1, M2, for example.

When the amount of slipping of the switching brake B0 placed in the slipping state under the control of the slipping-start control portion 116 is relatively small, for example, the electric energy amount generated by the first electric motor M1 is relatively large. When the amount of slipping of the switching brake B0 is relatively large, the electric energy amount generated by the first electric motor M1 is relatively small. The torque-receiving-proportion control portion 114 controls the amount of slipping of the switch brake B0 to optimize the balance between the charging and discharging amount of the electric-energy storage device 60, during starting of the vehicle by the engine 8 in the slipping state of the switching brake B0, in the same manner as described above with respect to the torque-receiving-proportion control portion 114. Namely, the torque-receiving-proportion control portion 114 controls the amount of slipping of the switching brake B0 on the basis of the electric energy amount SOC stored in the electric-energy storage device 60, and the difference of the electric energy amount consumed by the second electric motor M2 from the electric energy amount generated by the first electric motor M1. Described in detail, the torque-receiving-proportion control portion 114 controls the slipping amount of the switching brake B0 to increase the torque receiving ratio or amount of the switching brake B0 with an increase of the above-indicated difference and with a decrease of the residual energy-storage capacity of the electric-energy storage device 60 (the electric energy amount that can be further stored in the electric-energy storage device 60). During the vehicle starting by the engine 8 in the slipping state of the switching brake B0 under the control of the slipping-start control portion 116, the output of the first electric motor M1 and/or the output of the second electric motor M2 may be limited, so that the torque-receiving-proportion control portion 114 controls the slipping amount of the switching brake B0 while taking account of the output limitation of the electric motor M1 and/or second electric motor M2. Where the electric energy amount consumed by the second electric motor M2 is limited, for instance, the torque-receiving-proportion control portion 114 increases the slipping amount of the switching brake B0 to reduce the amount of electric energy generated by the first electric motor M1, for optimizing the charging and discharging amounts of the electric-energy storage device 60, and generating the required reaction torque corresponding to the required output torque of the differential portion 11 represented by the operating amount $A_{CC}$ of the accelerator pedal. The slipping-start control portion 116 also permits starting of the vehicle by the engine 8 in the slipping state of the switching clutch C0. In this case, the torque-receiving-proportion control portion 114 controls the slipping amount of the switching clutch C0 to optimize the charging and discharging amounts of the electric-energy storage device 60, in the same manner as described above with respect to the switching brake B0.

The torque circulation control portion 118 is configured to place the switching clutch C0 in the slipping state for controlling the state of circulation of the torque among the engine 8, first and second electric motors M1, M2 and the electric-energy storage device 60. In the slipping state of the switching clutch C0 under the control of the torque circulation control portion 118, the rotary elements of the differential portion 11 are gradually rotated as a unit, so that the torque transmitted to the power transmitting member 18 is increased. In this state, too, the torque-receiving-proportion control portion 114 optimizes the charging and discharging amounts of the electric-energy storage device 60 by controlling the slipping amount of the switching clutch C0, in the same manner as described above. Namely, the torque-receiving-proportion control portion 114 controls the slipping amount of the switching clutch C0 on the basis of the electric energy amount SOC stored in the electric-energy storage device 60 and the difference of the electric energy amount consumed by the second electric motor M2 from the electric energy amount generated by the first electric motor M1. Described more specifically, the torque-receiving-proportion control portion 114 increases the torque receiving ratio or amount of the switching clutch C0 with an increase of the above-indicated difference and with a decrease of the residual energy-storage capacity of the electric-energy storage device 60, for optimizing the charging amount SOC of the electric-energy storage device 60 and generating the required reaction torque corresponding to the required output torque of the differential portion 11 corresponding to the operating amount $A_{CC}$ of the accelerator pedal.

Figure 10:
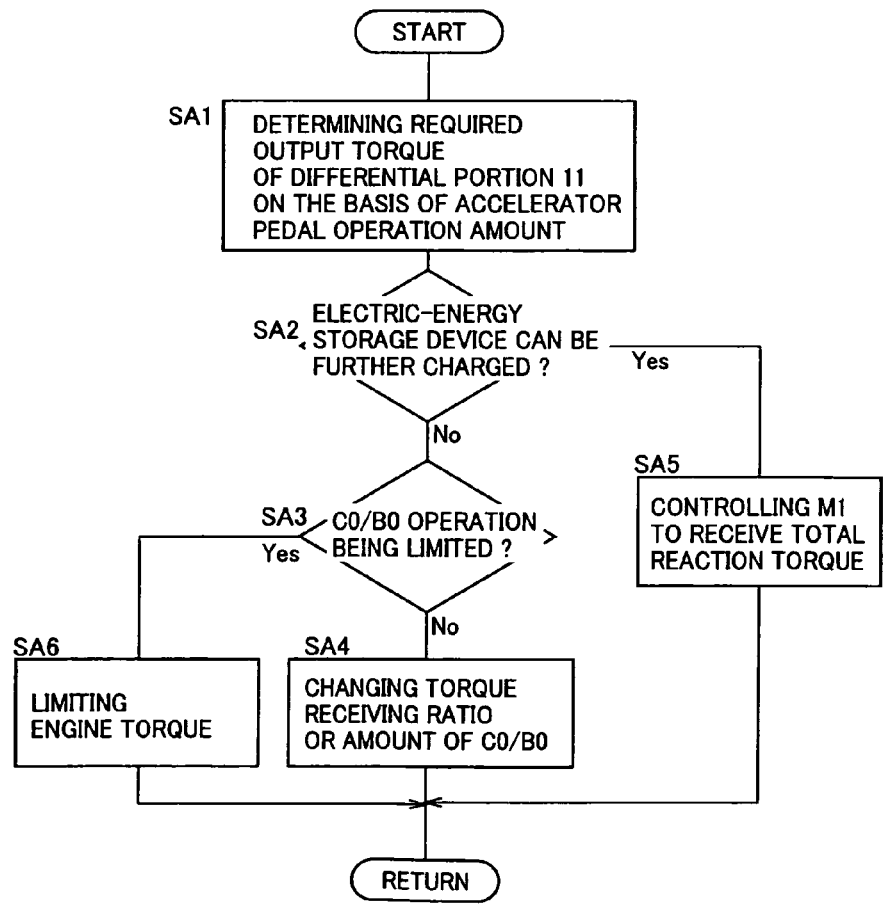
FIG. 10 is a flow chart illustrating a control routine executed by the electronic control device of FIG. 4, to optimize a balance between charging and discharging amounts of the electric-energy storage device.

Referring to the flow chart of FIG. 10, there will be described a major control function of the electronic control device 50, that is, a control routine to optimize a balance between the charting and discharging amounts of the electric-energy storage device 60. This control routine is repeatedly executed with an extremely short cycle time of about several milliseconds to about several tens of milliseconds.

The control routine is initiated with step SA1 corresponding to the hybrid control portion 52, to calculate the required output torque $T_{OUT}$ of the automatic transmission portion 20 on the basis of the operating amount $A_{CC}$ of the accelerator pedal, and calculate the required output torque of the differential portion 11 (namely, the input torque of the automatic transmission portion 20) on the basis of the calculated required output torque $T_{OUT}$ and the gear ratio of the automatic transmission portion 20. The hybrid control portion 52 controls the engine speed $N_E$, engine torque $T_E$ and the reaction torque, so as to obtain the required output torque of the differential portion 11. The control flow then goes to step SA2 corresponding to the charging-state determining portion 110, to detect the electric energy amount SOC stored in the electric-energy storage device 60, and determine whether the detected electric energy amount SOC is smaller than the predetermined upper limit. If an affirmative determination is obtained in step SA2, that is, if the electric energy amount SOC stored in the electric-energy storage device 60 is smaller than the upper limit so that the electric-energy storage device 60 can be further charged, the control flow goes to step SA5 corresponding to the hybrid control portion 52, in which the first electric motor M1 is operated to generate the electric energy for receiving the total reaction torque, in the conventional manner.

If a negative determination is obtained in step SA2, that is, if the electric energy amount SOC stored in the electric-energy storage device 60 is not smaller than the upper limit so that the electric-energy storage device 60 can no longer be charged with a large amount of electric energy, the control flow goes to step SA3 corresponding to the coupling-element operation-limitation determining portion 112, to determine whether the torque capacity of the switching brake B0 or clutch C0 is limited. If an affirmative determination is obtained in step SA3, the control flow goes to step SA6 corresponding to the hybrid control portion 52, to limit the torque $T_E$ of the engine 8 to a value below which the first electric motor M1 or the switching brake B0 or clutch C0 can receive the reaction torque corresponding to the engine torque $T_E$.

If a negative determination is obtained in step SA3, the control flow goes to step SA4 corresponding to the torque-receiving-proportion control portion 114, in which the torque-receiving-proportion control portion 114 controls the slipping amount of the switching brake B0 or clutch C0 on the basis of the difference of the electric energy amount consumed by the second electric motor M2 from the electric energy amount generated by the first electric motor M1, and the residual energy-storage capacity of the electric-energy storage device 60 (the electric energy amount that can be further stored in the electric-energy storage device 60). Described in detail, the torque-receiving-proportion control portion 114 increases the torque receiving ratio of the switching brake B0 or clutch C0 by increasing its slipping amount with a decrease of the residual energy-storage capacity of the electric-energy storage device 60, namely, with a decrease of a difference of the electric energy amount SOC from the upper limit, and with an increase of the difference of the electric energy amount consumed by the second electric motor M2 from the electric energy amount generated by the first electric motor M1 (with an increase of the generated electric energy amount minus the consumed electric energy amount). Thus, the amounts of charging and discharging of the electric-energy storage device 60 by the respective first and second electric motors M1, M2 are adjusted so that the electric energy amount SOC stored in the electric-energy storage device 60 will not exceed the predetermined upper limit. Namely, overcharging of the electric-energy storage device 60 is prevented by the torque-receiving-proportion control portion 114. Step SA4 may be formulated such that the torque-receiving-proportion control portion 114 controls the slipping amount of the switching brake B0 or clutch C0 so that the detected charging amount $W_{IN}$ and discharging amount $W_{OUT}$ of the electric-energy storage device 60 per unit time will not exceed the predetermined upper limits. This control of the slipping amount may be implemented with a higher degree of priority than the control based on the residual energy-storage capacity of the electric-energy storage device 60 and the above-indicated difference between the generated and consumed electric energy amounts. Thus, the charging and discharging amounts of the electric-energy storage device 60 (the amount of generation of the electric energy by the first electric motor M1 and the amount of consumption of the electric energy by the second electric motor M2) are always balanced to prevent overcharging of the electric-energy storage device 60, which would require limitation of the amount of generation of the electric energy by the first electric motor M1 and a rapid increase of the slipping amount of the switching brake B0 or clutch C0.

The electronic control device 40 constructed according to the present embodiment of the invention includes the torque-receiving-proportion control portion 114 configured to control that the proportion of the torque values of the reaction torque corresponding to the torque acting on the carrier CA0 of the differential portion 11, which torque values are respectively received by the first electric motor M1 and the switching clutch C0 or brake B0, such that the ratio of the torque value received by the switching clutch C0 or brake B0, with respect to the reaction torque, increases with an increase of the difference of the electric energy amount consumed by the second electric motor M2 from the electric energy amount generated by the first electric motor M. Accordingly, the ratio of the torque value received by the switching clutch C0 or brake B0 is increased as the above-indicated difference increases, that is, as the electric energy amount stored in the electric-energy storage device 60 increases, so that the reaction torque received by the first electric motor M1 is reduced, and the electric energy amount generated by the first electric motor M1 is accordingly reduced, whereby the electric energy amount supplied to the electric-energy storage device 60 is accordingly reduced. Thus, the balance between the charging and discharging amounts of the electric-energy storage device 6 is suitably optimized so as to prevent overcharging of the electric energy-storage device 60, making it possible to prolong the expected service life of the electric-energy storage device 60. Further, the required reaction torque corresponding to the required output torque of the difference portion 11 represented by the operating amount $A_{CC}$ of the accelerator pedal is suitably received by the first electric motor M1 and the switching clutch C0 or brake B0.

The present embodiment is further configured such that the switching brake B0 is a device operable to limit the rotary motion of the sun gear S0 of the differential portion 11, which sun gear S0 is connected to the first electric motor M1. Therefore, the proportion of the reaction torque values received by the first electric motor M1 and the switching brake B0 can be changed to control the electric energy amount generated by the first electric motor M1, by controlling the slipping amount of the switching brake B0. In addition, the switching brake B0 provided to selectively switch the differential portion 11 between the differential and non-differential states is utilized to control the electric energy amount generated by the first electric motor M1, so that the electric energy amount generated by the first electric motor M1 can be controlled without an increase of the number of the required components of the transmission mechanism 10.

The present embodiment is further configured such that the switching clutch C0 is a device operable to connect the sun gear S0 and carrier CA0 of the differential portion 11. Therefore, the proportion of the reaction torque values received by the first electric motor M1 and the switching clutch C0 can be changed to control the electric energy amount generated by the first electric motor M1, by controlling the slipping amount of the switching clutch C0. In addition, the switching clutch C0 provided to selectively switch the differential portion 11 between the differential and non-differential states is utilized to control the electric energy amount generated by the first electric motor M1, so that the electric energy amount generated by the first electric motor M1 can be controlled without an increase of the number of the required components of the transmission mechanism 10.

The present embodiment is further configured such that the torque-receiving-proportion control portion 114 is operated during the starting of the vehicle with the switching clutch C0 or brake B0 placed in the slipping state under the control of the slipping-start control portion 116, to control the proportion of the torque values of the reaction torque corresponding to the output of the engine 8, which torque values are respectively received by the first electric motor M1 and the switching clutch C0 or brake B0, such that the ratio of the torque value received by the switching clutch C0 or brake B0 increases with the increase of the difference of the electric energy amount consumed by the second electric motor M2 from the electric energy amount generated by the first electric motor M1. Accordingly, the balance between the charging and discharging amounts of the electric-energy storage device 60 is suitably optimized so as to prevent overcharging of the electric energy-storage device 60.

The present embodiment is further configured such that the torque-receiving-proportion control portion 114 is operated while the state of circulation of the torque is controlled with the switching clutch C0 or brake B0 placed in the slipping state under the control of the torque circulation control portion 118, to control the proportion of the torque values of the reaction torque corresponding to the output of the engine8, which torque values are respectively received by the first electric motor M1 and the switching clutch C0 or brake B0, such that the ratio of the torque value received by the switching clutch C0 or brake B0 increases with the increase of the difference of the electric energy amount consumed by the second electric motor M2 from the electric energy amount generated by the first electric motor M1. Accordingly, the balance between the charging and discharging amounts of the electric-energy storage device 60 is suitably optimized so as to prevent overcharging of the electric energy-storage device 60.

The present embodiment is arranged such that the torque-receiving-proportion control portion 114 increases the ratio of the torque value received by the switching clutch C0 or brake B0, with a decrease of the residual energy-storage capacity of the electric-energy storage device 60, that is, with a decrease of an electric energy amount that can be further stored in the electric-energy storage device 60. In this arrangement, the electric energy amount generated by the first electric motor M1 and supplied to the electric-energy storage device 60 is reduced when the residual energy-storage capacity of the electric-energy storage device 60 is relatively small. Accordingly, overcharging of the electric-energy storage device 60 is prevented. When the residual energy-storage capacity of the electric-energy storage device 60 is relatively large, on the other hand, the ratio of the torque value received by the switching clutch C0 or brake B0 is reduced to permit an increase of the electric energy amount regenerated by the first electric motor M1 operated as an electric generator, whereby the fuel economy of the vehicle can be improved.

The present embodiment is further arranged such that the proportion of the torque values received by the first electric motor M1 and the switching clutch C0 or brake B0 is changed when the charging amount $W_{IN}$ or discharging amount $W_{OUT}$ of the electric-energy storage device 60 per unit time exceeds the predetermined upper limit. In this arrangement, the ratio of the torque value received by the switching clutch C0 or brake B0 is increased when the charging amount $W_{IN}$ of the electric-energy storage device 60 per unit time exceeds the upper limit, for example. Accordingly, overcharging of the electric-energy storage device 60 is prevented. When the discharging amount $W_{OUT}$ of the electric-energy storage device 60 per unit time exceeds the upper limit, on the other hand, the ratio of the torque value received by the first electric motor M1 is increased. Accordingly, overdischarging of the electric-energy storage device 60 is prevented.

The present embodiment is further arranged such that the hybrid control portion 52 limits the output torque $T_E$ of the engine 8 when the torque capacity of the switching clutch C0 or brake B0 is limited. In this arrangement, the output torque $T_E$ of the engine 8 is reduced to a value below which the first electric motor M1 or the switching clutch C0 or brake B0 can receive the reaction torque corresponding to the output torque $T_E$ of the engine 8, even while the torque capacity of the switching clutch C0 or brake B0 is limited.

The present embodiment is further arranged such that the hybrid control portion 52 calculates the output torque of the differential portion 11 on the basis of the operating amount $A_{CC}$ of the accelerator pedal. In this arrangement, the reaction torque can be controlled on the basis of the output torque $T_E$ of the engine 8 and the output torque of the differential portion 11.

The present embodiment is further arranged such that the differential portion 11 functions as an electrically controlled continuously-variable transmission portion. In this arrangement, the speed ratio of the differential portion 11 can be continuously changed by controlling the first electric motor M1 or the second electric motor M2, so that the vehicle drive force can be changed over a wide range of the speed ratio.

While the preferred embodiment of this invention has been described in detail by reference to the accompanying drawings, for illustrative purpose only, it is to be understood that the present invention may be embodied with various changes and modifications which may occur to those skilled in the art.

In the illustrated embodiment, the first electric motor M1 functions as an electric generator while the second electric motor M2 functions to generate a vehicle drive force. However, it is possible that the second electric motor M2 is operated as an electric generator to generate a regenerative braking force (generate an electric energy) while the first electric motor M1 functions to generate a vehicle drive force, during deceleration of the vehicle. In this case, the amount of electric energy supplied from the electric-energy storage device 50 to the first electric motor M1, and the amount of electric energy generated by the second electric motor M2 are detected according to the principle of the present invention. d embodiment.

In the illustrated transmission mechanism 10, the switching clutch C0 is provided to selectively connect the sun gear S0 and carrier CA0 of the planetary gear set 24 of the differential portion 11. However, the switching clutch C0 may be provided to selectively connect any other combination of two elements of the three rotary elements S0, CA0 and R0 of the planetary gear set 24, for instance, the sun gear S0 and the ring gear R0.

In the illustrated transmission mechanism 10, the second electric motor M2 is directly connected to the power transmitting member 18. However, the second electric motor M2 may be connected, either directly or indirectly via a transmission to any portion of the power transmitting path between the differential portion 11 and the drive wheels 38.

In the illustrated transmission mechanism 10, the differential portion 11 is operable as an electrically controlled continuously-variable transmission the speed ratio γ0 of which is variable from the minimum value γ0min to the maximum value γ0max. However, the speed ratio γ0 of the differential portion 11, 211 may be variable in steps by utilizing its differential function.

In the power distributing mechanism 16 in the illustrated transmission mechanism 10, the carrier CA0 is fixed to the engine 8, and the sun gear S0 is fixed to the first electric motor M1 while the ring gear R0 is fixed to the power distributing member 18. However, this arrangement is not essential. The engine 8, first electric motor M1 and power transmitting member 18 may be fixed to any other elements selected from the three elements CA0, S0 and R0 of the planetary gear set 24.

While the engine 8 is directly fixed to the input shaft 14 in the illustrated transmission mechanism 10, the engine 8 may be operatively connected to the input shaft 14 through any suitable member such as gears and a belt, and need not be disposed coaxially with the input shaft 14.

In the illustrated transmission mechanism 10, the first and second electric motors M1, M2 are disposed coaxially with the input shaft 14 such that the first electric motor M1 is connected to the sun gear S1 while the second electric motor M2 is connected to the power transmitting member 18. However, this arrangement is not essential. For instance, the first electric motor M1 may be operatively connected to the sun gear S0 through gears, a belt or a speed reduction device, while the second electric motor M2 may be connected to the power transmitting member 18.

Each of the first clutch C1, second clutch C2 and other hydraulically operated frictional coupling devices used in the illustrated transmission mechanism 10 may be replaced by any powder-type, magnetic-type or mechanical-type coupling device, such as a powder clutch, an electromagnetic clutch and a meshing-type dog clutch. Where the electromagnetic clutches are used, for instance, the hydraulic control unit 42 incorporating valve devices for switching hydraulic circuits for controlling the hydraulically operated frictional coupling devices is replaced by an electrical or electromagnetic switching device for switching electric circuits for controlling the electromagnetic clutches.

In the illustrated transmission mechanism 10, the automatic transmission portion 20 is connected in series with the differential portion 11 through the power transmitting member 18. However, the automatic transmission portion 20 may be disposed coaxially with a counter shaft which is parallel to the input shaft 14 in a radially-spaced relationship with the input shaft 14. In this case, the differential portion 11 and the automatic transmission portion 20 are operatively connected to each other through a pair of counter gears, a combination of sprockets and a chain, or any other set of power transmitting members.

The power distributing mechanism 16 provided as a differential mechanism in the illustrated transmission mechanism 10 may be replaced by a differential gear device including a pinion rotated by the engine 8, and a pair of bevel gears which meshes with the pinion and which is operatively connected to the first electric motor M1 or power transmitting member 18 (second electric motor M2).

While the power distributing mechanism 16 in the illustrated transmission mechanism 10 is constituted by the single planetary gear set 24, the power distributing mechanism 16 may be constituted by two or more planetary gear sets so that the power distributing mechanism 16 functions as a transmission having three or more fixed speed ratios when the mechanism 16 is placed in the non-differential state (fixed-speed-ratio shifting state). Further, the power distributing mechanism 16 may be constituted by a double-pinion type planetary gear set. Where the power distributing mechanism 16 is constituted by two or more planetary gear sets, the rotary elements of these planetary gear sets are operatively connected to the engine 8, first and second electric motors M1, M2 and power transmitting member 18, and the power distributing mechanism 16 is switched between the step-variable shifting state and the continuously-variable shifting state, by controlling a clutch C and a brake B connected to the rotary elements.

While the engine 8 and the differential portion 11 are connected directly to each other in the illustrated transmission mechanism 10, the engine 8 and the differential portion 11, 211 may be connected to each other through a clutch device.

In the illustrated transmission mechanism 10, the differential portion 11 and the automatic transmission portion 20 are connected in series with each other. However, the present invention is applicable to a vehicular power transmitting system in which the differential portion 11 and the automatic transmission portion 20 are not mechanically independent of each other, provided the transmission mechanism 10 as a whole has an electrically controlled differential function, and a function of changing its overall speed ratio in a manner other than the electrically controlled differential function. The differential portion 11 and the automatic transmission portion 20 may be located relative to each other, as needed, in the transmission mechanism 10. Further, the principle of the present invention is applicable to a vehicular power transmitting system wherein a mechanism functioning as the electrically controlled differential portion and a mechanism functioning to a transmission are partially or totally commonly provided by a single mechanism.

The automatic transmission portion 20 of the illustrated transmission mechanism 10 has the five forward-drive gear positions. However, the automatic transmission portion 20 may be modified to have four or less forward-drive gear positions or six or more forward-drive gear positions. Further, the connections of the rotary elements of the planetary gear sets 26, 38, 30 of the automatic transmission portion 20 are not limited to those in the illustrated embodiment, but may be changed as desired.

It is to be understood that the present invention may be embodied with other changes and improvement that may occur to those skilled in the art.

What is claimed is:

1. A control apparatus for a vehicular power transmitting system including (a) an electrically controlled differential portion operable to distribute an output of a drive power source of a vehicle to a first electric motor and a power transmitting member, (b) a second electric motor connected to a power transmitting path between an output shaft of said drive power source and a drive wheel of the vehicle, (c) a coupling device provided in the electrically controlled differential portion and operable to selectively switch the electrically controlled differential portion between a differential state and a non-differential state, and (d) an electric-energy storage device operable to store and discharge an electric energy supplied from the first or second electric motor, said control apparatus comprising:

a torque-receiving-proportion control portion configured to control a proportion of torque values of a reaction torque corresponding to a torque acting on a predetermined member of said electrically controlled differential portion, which torque values are respectively received by said first electric motor and said coupling device, such that a ratio of the torque value received by the coupling device, with respect to said reaction torque, increases with an increase of a difference of an electric energy amount consumed by said second electric motor from an electric energy amount generated by said first electric motor.

2. The control apparatus according to claim 1, wherein said coupling device is operable to limit a rotary motion of a rotary element of said electrically controlled differential portion, which rotary element is connected to said first electric motor.

3. The control apparatus according to claim 1, wherein said coupling device is operable to connect at least two coupling elements of a plurality of rotary elements of the electrically controlled differential portion.

4. The control apparatus according to claim 2, further comprising a slipping-start control portion configured to place said coupling device in a slipping state upon starting of the vehicle by said drive power source, and wherein said torque-receiving-proportion control portion is operated during the starting of the vehicle with the coupling device placed in the slipping state under the control of said slipping-start control portion, to increase the ratio of the torque value received by the coupling device, with the increase of the difference of the electric energy amount consumed by the second electric motor from the electric energy amount generated by the first electric motor.

5. The control apparatus according to claim 3, further comprising a slipping-start control portion configured to place said coupling device in a slipping state upon starting of the vehicle by said drive power source, and wherein said torque-receiving-proportion control portion is operated during the starting of the vehicle with the coupling device placed in the slipping state under the control of said slipping-start control portion, to increase the ratio of the torque value received by the coupling device, with the increase of the difference of the electric energy amount consumed by the second electric motor from the electric energy amount generated by the first electric motor.

6. The control apparatus according to claim 3, further comprising a torque circulation control portion configured to place said coupling device in a slipping state, for controlling a state of circulation of the torque among said drive power source, said first and second electric motors and said electric-energy storage device, and wherein said torque-receiving-proportion control portion is operated while the state of circulation of the torque is controlled with the coupling device placed in the slipping state under the control of said torque circulation control portion, to increase the ratio of the torque value received by the coupling device, with the increase of the difference of the electric energy amount consumed by the second electric motor from the electric energy amount generated by the first electric motor.

7. The control apparatus according to claim 1, wherein said torque-receiving-proportion control portion increases the ratio of the torque value received by the coupling device, with a decrease of a residual energy-storage capacity of the electric-energy storage device.

8. The control apparatus according to claim 1, wherein said torque-receiving-proportion control portion changes the proportion of the torque values which torque values are respectively received by said first electric motor and said coupling device, when a changing amount or a discharging amount of the electric-energy storage device per unit time exceeds a predetermined upper limit.

9. The control apparatus according to claim 1, further comprising a hybrid control portion configured to limit an output torque of the drive power source when a torque capacity of the coupling device is limited.

10. The control apparatus according to claim 1, further comprising a hybrid control portion configured to calculate an output torque of the electrically controlled differential portion on the basis of an operating amount of an accelerator pedal of the vehicle.

11. The control apparatus according to claim 1, wherein said electrically controlled differential portion functions as an electrically controlled continuously-variable transmission portion.

* * * * *